United States Patent
Ogawa

(10) Patent No.: US 10,452,300 B2
(45) Date of Patent: Oct. 22, 2019

(54) STORAGE SYSTEM, NODE APPARATUS, CACHE CONTROL METHOD AND PROGRAM

(71) Applicant: NEC Corporation, Tokyo (JP)

(72) Inventor: Shugo Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 332 days.

(21) Appl. No.: 15/024,809

(22) PCT Filed: Sep. 30, 2014

(86) PCT No.: PCT/JP2014/075990
§ 371 (c)(1),
(2) Date: Mar. 24, 2016

(87) PCT Pub. No.: WO2015/046552
PCT Pub. Date: Apr. 2, 2015

(65) Prior Publication Data
US 2016/0266844 A1    Sep. 15, 2016

(30) Foreign Application Priority Data

Sep. 30, 2013 (JP) ................................ 2013-204914

(51) Int. Cl.
*G06F 3/06* (2006.01)
*G06F 12/08* (2016.01)
(Continued)

(52) U.S. Cl.
CPC ............ *G06F 3/0647* (2013.01); *G06F 3/067* (2013.01); *G06F 3/0613* (2013.01);
(Continued)

(58) Field of Classification Search
CPC ...... G06F 3/0647; G06F 3/0613; G06F 3/067; G06F 3/0685; G06F 9/4856;
(Continued)

(56) References Cited

U.S. PATENT DOCUMENTS

| 6,601,144 B1 | 7/2003 | Arimilli et al. |
| 2010/0005261 A1* | 1/2010 | Shiga .................... G06F 1/3268 711/162 |

(Continued)

FOREIGN PATENT DOCUMENTS

JP    H01197858 A    8/1989

OTHER PUBLICATIONS

International Search Report corresponding to PCT/JP2014/075990 dated Dec. 9, 2014 (4 pages).

(Continued)

*Primary Examiner* — Gurtej Bansal
(74) *Attorney, Agent, or Firm* — Wilmer Cutler Pickering Hale and Dorr LLP

(57) ABSTRACT

Each node includes a cache to store data of the storage shared by the plurality nodes. Time information when a process accessing to data migrates from one node to another node is recorded. The one node, after migration of the process to the other node, selectively invalidates data held in the cache of the one node with a time of last access thereto by the process on the one node being older than a time of migration of the process from the one node to the other node.

22 Claims, 19 Drawing Sheets

(51) Int. Cl.
*G06F 12/0808* (2016.01)
*G06F 12/0815* (2016.01)
*G06F 9/48* (2006.01)
*G06F 12/0813* (2016.01)
*G06F 12/0891* (2016.01)
*G06F 12/0893* (2016.01)

(52) U.S. Cl.
CPC .......... *G06F 3/0685* (2013.01); *G06F 9/4856* (2013.01); *G06F 12/0808* (2013.01); *G06F 12/0813* (2013.01); *G06F 12/0815* (2013.01); *G06F 12/0891* (2013.01); *G06F 12/0893* (2013.01); *G06F 2212/1016* (2013.01); *G06F 2212/1024* (2013.01); *G06F 2212/152* (2013.01); *G06F 2212/60* (2013.01)

(58) Field of Classification Search
CPC ............. G06F 12/0815; G06F 12/0808; G06F 12/0813; G06F 12/0891; G06F 12/0893; G06F 2212/1016; G06F 2212/152; G06F 2212/1024; G06F 2212/60
See application file for complete search history.

(56) References Cited

U.S. PATENT DOCUMENTS

2011/0314224 A1* 12/2011 Piry .......................... G06F 9/52
                                                                  711/118
2014/0297780 A1* 10/2014 Zhou .................. H04L 67/2847
                                                                  709/216

OTHER PUBLICATIONS

Paramarco, M.S.; Patel, J. H. (1984) "A low-overhead coherence solution for multiprocessors with private cache memories" Proceedings of the 11th annual international symposium on Computer architecture, ISCA '84, pp. 348-354.

Yuan et al., "A Timestamp-based Selective Invalidation Scheme for Multiprocessor Cache Coherence," 1996 International Conference on Parallel Processing, IEEE, vol. 3, pp. 114-121, Aug. 12, 1996.

* cited by examiner

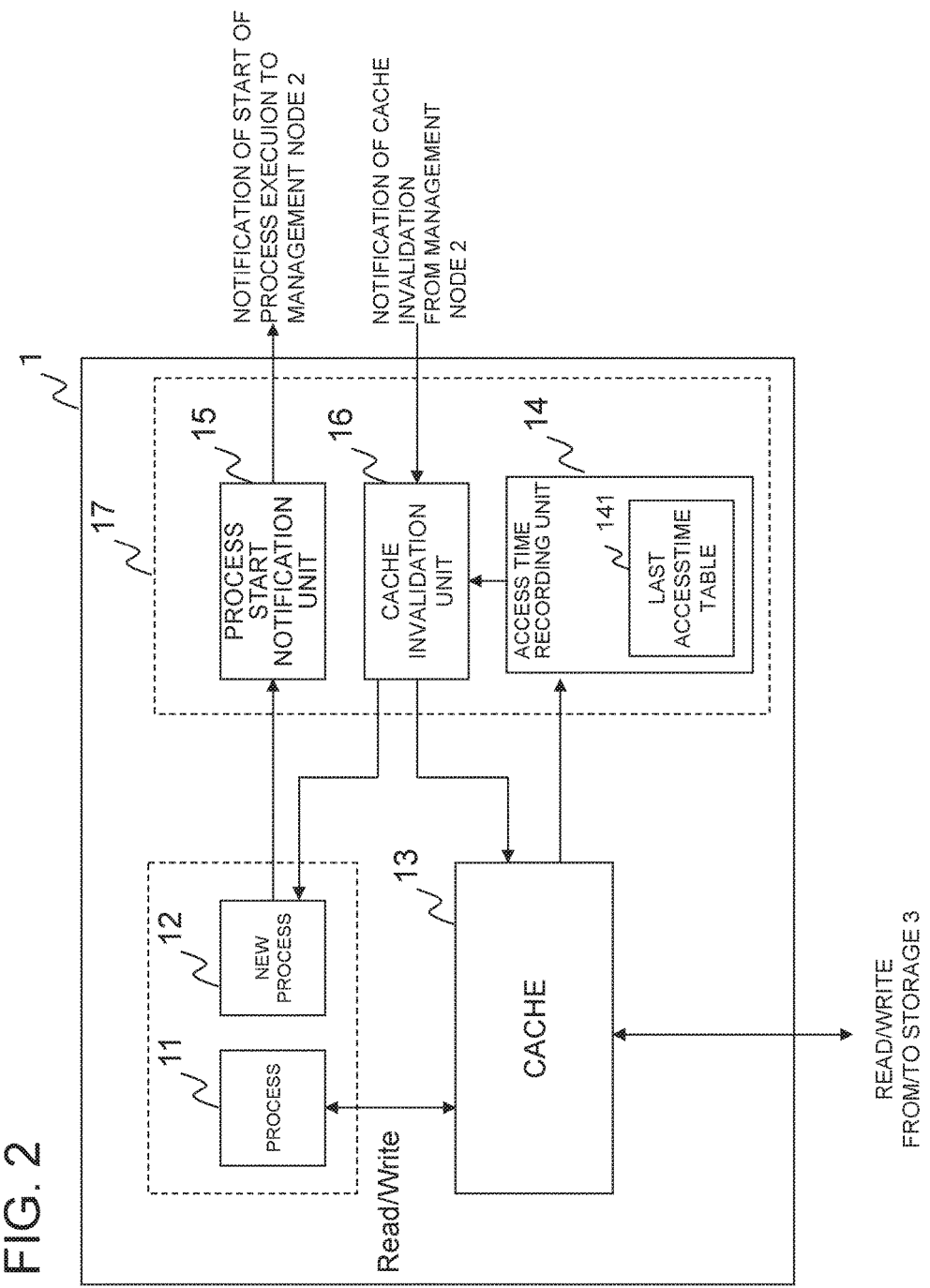

FIG. 3A

| DATA IDENTIFIER | LAST ACCESS TIME |
|---|---|
| 0x0000000000 | 2013/04/01  12:34:56.789 |
| 0x0012A00000 | 2013/04/01  01:23:54.876 |
|  |  |

| PAGE ADDRESS | INVALID | STORAGE LOCATION ADDRESS | UPDATED | REPLACEMENT PRIORITY | LAST ACCESS TIME |
|---|---|---|---|---|---|
|  |  |  |  |  |  |
|  |  |  |  |  |  |

| PROCESS IDENTIFIER (2111) | EXECUTION NODE IDENTIFIER (2112) | 211 |
|---|---|---|
| 1001 | Node001 | |
| 1002 | Node002 | |
| ⋮ | ⋮ | |

FIG. 6

| PROCESS IDENTIFIER | NODE EXECUTION COMPLETION TIME (NODE 001) | NODE EXECUTION COMPLETION TIME (NODE 002) |
|---|---|---|
| 1001 | 2013/04/01 12:34:56.789 | 2013/03/31 21:43:05.987 |
| 1002 | 2013/04/01 01:23:54.876 | 1970/01/01 00:00:00.000 |

FIG. 11

| PROCESS IDENTIFIER | NODE A EXECUTION COMPLETION TIME | NODE B EXECUTION COMPLETION TIME |
|---|---|---|
| VM-A | 2013/01/01 12:34:56.789 | 1970/01/01 00:00:00.000 |
| VM-B | 2013/01/15 05:36:48.210 | 1970/01/01 00:00:00.000 |
| VM-C | 2013/02/01 23:01:45.543 | 1970/01/01 00:00:00.000 |

FIG. 12

| PROCESS IDENTIFIER | EXECUTION NODE IDENTIFIER |
|---|---|
| VM−A | NODE B |
| VM−B | NODE A |
| VM−C | NODE B |

FIG. 13

| PROCESS IDENTIFIER | NODE A EXECUTION COMPLETION TIME | NODE B EXECUTION COMPLETION TIME |
|---|---|---|
| VM-A | 2013/04/01 00:00:00.000 | 1970/01/01 00:00:00.000 |
| VM-B | 2013/01/15 05:36:48.210 | 1970/01/01 00:00:00.000 |
| VM-C | 2013/04/01 00:00:00.000 | 1970/01/01 00:00:00.000 |

FIG. 14

| DATA IDENTIFIERS | LAST ACCES STIME |
|---|---|
| 0x00000000 | 2013/04/01 12:34:56.000 |
| 0x10000000 | 2013/03/31 23:45:12.876 |
| 0x20000000 | 2013/04/01 01:23:54.789 |

TIME T0: PROCESS A MIGRATES TO ANOTHER NODE 1-2

TIME T1: PROCESS A MIGRATES TO ORIGINAL NODE 1-1

FIG. 19

| INVALID | PAGE ADDRESS | STORGAE LOCATION ADDRESS | UPDATED | REPLACEMENT PRIORITY |
|---|---|---|---|---|
| No | 0 | 1 | No | 3 |
| No | 100 | 2 | Yes | 4 |
| No | 400 | 3 | No | 1 |
| No | 200 | 4 | No | 2 |
| No | 1 | 5 | Yes | 5 |
| Yes | | 6 | | |
| ⋮ | ⋮ | ⋮ | ⋮ | ⋮ |

STORAGE SYSTEM, NODE APPARATUS, CACHE CONTROL METHOD AND PROGRAM

DESCRIPTION OF RELATED APPLICATION

This application is a national stage application of International Application No. PCT/JP2014/075990 entitled "STORAGE SYSTEM, NODE APPARATUS, CACHE CONTROL METHOD AND PROGRAM," filed on Sep. 30, 2014, which claims benefits of priority of Japanese Patent Application 2013-204914, filed Sep. 30, 2013, the total content thereof being incorporated by reference into the present application.

This invention relates to a storage system, a node apparatus, a cache control method and a cache control program.

BACKGROUND

Recently, with advances in information communication technology and expansion of field of its application, a target to which an information processing system is applied and a processing amount dealt with in the system are increasing. In a information processing system, in order to cope with increasing processing amount and data volume, there has been employed such an architecture in which the information processing system is composed by a plurality of computers interconnected via a bus or a communication network so as to improve a system performance.

<Inter-Node Migration of Processing or VMs>

Since a load on a computer is varied in accordance with processing content and time, such a technique is used in which, in an information processing system made up of a plurality of computers (nodes), a process is migrated from one computer to another depending on a load to accomplish load distribution, and improve utilization efficiency of each computer and a system performance as a whole. When, for example, a processing load in a computer is increased to close to a performance limit, the computer executing the process is changed to another computer with a lighter load to improve utilization efficiency of computer resources and performance. Process migration may also be utilized in a virtualized system. For example, a virtualization mechanism, such as a hypervisor, is implemented on a server to virtualize hardware resources, such as a CPU (central processing unit) or a memory. A virtual OS (operating system) is run on this virtualization mechanism and an application is executed to implement a virtualization environment including virtual machines (VMs). In the virtualization environment, there are cases in which a VM is migrated to improve performance or utilization efficiency of computer resources. When a VM as a unit is migrated, such as when a VM that executes a process is changed to another VM, an image (VM image) of a system disk of the VM to be migrated is accessed from a computer that executes a VM after migration to implement hot migration of the VM. When migrating a VM from one computer (node) to another computer (node), by way of inter-node migration of the VM, status information of the VM to be migrated is copied to e.g., a computer which is a destination of the migration. The status information of the VM includes total memory information inclusive of network connection information and total information relating to processor (CPU), such as dump information of registers of the VM. Data referenced by a process, such as VM's status information or VM image, are stored in a storage shared by a plurality of computers.

<Storage Cache>

It is known that in an information processing system that includes a plurality of computers (nodes) and has a system configuration in which multiple nodes share a single storage, accesses to the shared storage may be a limiting factor of the system performance (a bottleneck). It is supposed that, though not limited thereto, a plurality of nodes are connected to the shared storage via a network or a bus. Representative of the bottlenecks are:

a load due to an access request to the shared storage, and
a network load that increases with increase in access requests.

As is well-known, a cache (a storage cache) that temporarily holds a copy as well as an update of a part of data stored in a storage is used as a technique to reduce access requests to the storage and improve access performance. The storage cache is constituted by a DRAM (dynamic random access memory) or an SSD (solid state device, for example a NAND type non-volatile memory or flash memory), as an example, and allows faster access as compared with a case of accessing from a computer (node) to a storage. By storing in a cache a copy of data that has a high access frequency, access to data without access to the storage is enabled, or to reduce the number of times of accesses to the storage. Among data held in the cache, less accessed data are purged from the cache and copy of frequently accessed data are held in the cache. When data for an access request hits in a read access, the data that has so hit is returned as a response to a source of the access request. In a write request, data that has hit in the cache is updated and a write completion response is returned to the source of the write request. In the case of a write-back system, for example, afterwards, the update of data in the cache is reflected in the storage.

<Cache Coherency>

Even in a system in which a plurality of nodes share a common storage, cache access performance may be lowered due to deteriorated cache performance caused by increased accesses to the cache from a plurality of nodes or to increased loads on a network caused by increasing accesses from a plurality of nodes. Thus, such a configuration is used in which an individual cache (local cache/private cache) is provided in each of a plurality of nodes (see e.g., Non-Patent Literature 1). In this case, a mechanism for maintaining cache coherency is implemented in each cache of a plurality of nodes. Cache coherency means data consistency, which should be maintained so that, even in the case where each of a plurality of nodes has updated data, data accessed would be the latest correct data. In general, data stored in the shared storage can be referenced from a plurality of nodes. Assuming that identical data in a shared storage are stored in respective caches of one node and the other node, and the data held in the cache of the one node is updated by a process executed in the one node, it is necessary to reflect an update executed in the one node in the data held in the cache of the other node, or to invalidate the data held in the cache of the other node.

The following describes an example operation of a typical system of a relevant technique, including a storage shared by a plurality of nodes, each of which has a cache for temporarily holding a copy or an update of data stored in the shared storage, with reference to FIG. 18. A CPU of a node 101-1 writes update data in a cache (local cache) of the node 101-1 (1: update).

The CPU of the node 101-1 notifies a CPU of a node 101-2 a destination address (a cache line) of updated data by way of notification of update of the data (2: notification of update by address). It is noted that 2: notification of update by address may be made simultaneously as or directly before the update of data (write) in the cache of the node 101-1.

On reception of the update notification from the node 101-1, if the cache of the node 101-2 holds the data of the address (pre-update data), the node 101-2 invalidates the data (3: invalidate).

The CPU of the node 101-1 writes back the updated data of the cache of the node 101-1 to the shared storage 3 (4: write-back (reflect)).

When the CPU of the node 101-2 makes reference to the said data, since the said data in the cache of the node 101-2 has been invalidated (with an invalidate flag, not shown, being turned on, as an example), no cache hit occurs in the node 101-2 (5: miss). The CPU of the node 101-2 reads data that has reflected the update by the node 101-1, from the shared storage 3, and registers the data in the cache of the node 101-2 (6: read updated data). It is noted that, if, in storing the updated data from the shared storage 3 in the cache of the node 101-2, there is no sufficient vacant capacity left in the cache of the node 101-2, data invalidated or data with the least referencing frequency is purged from the cache to secure a free space in the cache.

When the node 101-2 makes reference to the said data, the CPU of the node 101-2 makes reference to the updated data registered in the cache of the node 101-2 (7: access).

<Example of the Management Information for the Storage Cache>

FIG. 19 schematically illustrates an example of management information for the cache shown in FIG. 18. The cache management information is managed by a cache controller, for example, not shown in FIG. 18, and is provided in a cache controller or in a memory area in each cache, different from a cache memory. Though not limited thereto, the cache management information includes an invalid flag, a page address, a storage location address, an updated flag, replacement priority and so forth. The invalid flag is a flag that indicates data of each page being invalid (Yes) or not invalid (No). Cache data in a cache entry with the invalid flag set to Yes is not read and written (update) and is preferentially purged from the cache when the cache data is replaced. The page address is a page address (logical address) in the entire storage corresponding to a page held in the cache. It is noted that a memory area of a storage cache is usually managed in terms of a page of a fixed page size, such as 4 KB (KiloByte) or 8 KB as a unit. The location address indicates an address in the cache into which the page (cache record) is stored. The updated flag indicates whether or not the page (cache record) in the cache has been updated after the data has been held in the cache. The updated flag indicates No in case data of the page in the cache has been updated but the update content has not yet been reflected (written back) in the storage, while indicating Yes in case after the data has been stored in the page in the cache, the data in the page has not yet been updated, or the update content has been reflected in the storage. The replacement priority is information indicating a degree of priority of replacement of a corresponding page in a cache. The degree of priority may be so set that, if the value of the replacement priority is positive, the larger the value of the extent of priority, the more preferentially the page is replaced. Or, the smaller the value of the extent of priority, the more preferentially the page may be replaced. By the way, in the cache management information of FIG. 19, the page address may be a path name (file name) in a file system implemented in the storage.

<MESI-Protocol>

In case a storage area is shared by a plurality of nodes, such a protocol that is to maintain cache coherency for caches that are distributed in nodes, such as MESI-protocol, is used. In a well-known manner, the MESI-protocol takes following states:

(1) Modified: The cache line (data) is present only in a pertinent cache and has been modified from data in a shared storage (dirty). A cache mechanism must write back this cache line (data) in the shared storage at some time before permitting another CPU to read the corresponding cache line (data) from the shared storage.

(2) Exclusive: The cache line (data) is present only in a pertinent cache but matches with data in the shared storage (clean).

(3) Shared: The same cache line (data) exists in another cache in the system and matches the data in the shared storage.

(4) Invalid: Indicate that this cache line (data) is invalid.

In the foregoing, 'a cache for a shared storage' is replaced a CPU cache that holds data of a main memory. For example, if a read access request is issued to a line (data) of an Invalid state, data must be read from the shared storage, and the line (data) transfers to the Shared or Exclusive state. It is only in the Modified state or in the Exclusive state that a write access to the cache can be performed. If the cache line is in the Shared state, another cache in the system, more precisely, a relevant cache line or data in such another cache, must be invalidated before writing in the cache. This is normally carried out by a broadcast operation which is termed 'Read For Ownership (RFO)'. In the cache, a cache line (data) in a state different from the Modified state may be discarded at any time, changing the cache line to the Invalid state. It is noted that the cache line (data) in the Modified state has to be necessarily written back to the shared storage.

Non-Patent Literature 1: Paramarco, M. S.; Patel, J. H. (1984) "A low-overhead coherence solution for multiprocessors with private cache memories" Proceedings of the 11th annual international symposium on Computer architectur—ISCA '84. P. 348

SUMMARY

The following gives an analysis of the relevant art.

<Mapping of an Address Space in a Shared Storage and Cache Coherency>

In the information processing system of the relevant art, in which a storage is shared by a plurality of nodes, each of which includes a cache, in order to identify data updated in the cache of a given node, a location address of data in the shared storage corresponding to the data updated in the cache, is notified to another node, as described with reference to FIG. 18, and the data in the cache of the other node is invalidated so as to maintain cache coherency. In this case, an area in the shared storage indicated by an address (logical address) of data must be unique among a plurality of nodes. That is, it is premised that regarding a logical address of a data storage location in the shared storage, the same address space is used among a plurality of nodes.

In the case wherein a storage area in the shared storage is mapped on an address space in a different manner from one node to another (for example, correspondence between a logical address and a physical address of a storing location of data in the shared storage differs from one node to another), even if a node that has updated data in a cache of the node notifies another node of update of data, using 'notification of update by address as indicated by 2) in FIG. 18, it is not possible for the other node to identify the data updated in the cache on the one node from the location address of the shared storage notified. It is thus not possible for the cache on the other node to selectively invalidate the cache record (entry) corresponding to the data updated in the one node. On the other hand, even if the content updated in the cache of the one node is reflected (written back) by the one node on the data in the shared storage, it is not possible for the other node, in which mapping of the logical address differs from that of the one node, to read data, on which the update has been reflected, from the shared storage into the cache of the other node. It is thus not possible to maintain cache coherency.

As is well-known, thin provisioning is a technique (virtualization technique) that gives appearance as if a storage allocated to an application or a server has a wider available space than a physical capacity of a physical storage actually allocated. In the thin provisioning, a capacity requested by the node (server) is allocated to the storage as a virtual volume. The node (server) recognizes such a virtual volume, as a logical volume. A necessary minimum physical capacity, as an example, is allocated to the virtual volume as an initial capacity. After starting the operation or management, a physical capacity is dynamically allocated to the virtual volume in dependence upon the volume of the written data. By thus decreasing the physical capacity allocated to the vacant capacity of the logical volume in the storage, that is, by not allocating a large logical volume in the initial stage, it is possible to raise the utilization efficiency of the storage. More specifically, since a large physical volume is not allocated in the initial stage, it is possible to avoid the situation that the physical capacity has been allocated at the outset to the void capacity of the logical volume.

In the case wherein a storage area in the storage for each node is secured by the thin provisioning or the like, when a data write volume has increased in one node, a physical memory is newly allocated from a storage pool to the one node. A storage area of a virtual volume of the pertinent node may thus be increased from an initially set value (for example, 10 TB (TeraBytes)) (to for example 0.30 TB). In allocating a storage area, mapping of a storage area (physical page) to an address space (logical address space) is altered, due to a difference in an access pattern of processing executed in the node. Thus, in the case wherein in a virtual system in which a VM image is stored in a node cache and in a storage shared by the nodes, and the node on which the VM is executed may be changed, a storage area in each node is secured by the thin provisioning or the like, it is not possible to utilize a commonly used protocol designed to maintain cache coherency, because the mapping of the address space in the shared storage differs from one node to another. Such situation may arise in a system other than a virtualized system equipped with VMs. When the mapping of the address space of the storage area in the shared storage differs from one node to another, it is necessary to invalidate an entire cache content in a node each time data write (update) occurs in the cache of another node.

<Deterioration in Performance Due to Invalidation of Cache Content>

When cache data is updated in one node, and an address of the data in the shared storage is notified to another node ('notification of update by address' in FIG. 18), since address mapping (mapping from a virtual address space or logical address space to a physical address space) in the other node differs from that in the one node, it is not possible for the other node to identify the data from a page address of the storage location of the updated data notified. The other node thus invalidates all data held in its cache. By such invalidation of the all data held in the cache, the all cache records are deleted. In invalidating the cache in its entirety, a workload in the processing for invalidation is needed. In addition, there is no data held in the cache where the invalidation is completed. There occur cache misses for almost all accesses until data frequently accessed are held in the cache and this results in the lowering of the access performance.

A frequency of writes of data in the shared storage is proportional to the number of nodes that share the storage. Thus, in the case wherein in a cache of each node in a large-scale system having a larger number of nodes, all data that has a possibility of been updated in other node, is to be invalidated, there is a concern about a significant lowering of a system performance due to invalidation of the entirety of the cache in each node.

In view of the above mentioned problems of the relevant art, it is an object of the present invention to provide, in a system in which each of a plurality of nodes includes a cache for a storage shared by the plurality of nodes, an apparatus, a method and a program which make it possible to reduce an amount of data invalidated to maintain cache coherency, and to suppress the performance from being lowered.

In one aspect of the present invention, there is provided a storage system comprising a plurality of nodes and a storage shared by the nodes, each node including a cache to hold data in the storage temporarily, wherein time information concerning a time when a process accessing to the data migrates from one node to other node is recorded, the one node, after migration of the process to the other node, selectively invalidates, out of data held in the cache of the one node, data accessed at least by the process on the one node with a time of last access thereto by the process being older than a time of the migration of the process from the one node to the other node.

In another aspect of the present invention, there is provided a node apparatus including a cache that temporarily stores data of a storage shared by a plurality of node apparatus, wherein the node apparatus comprises an access time recording unit that records a time of an access each time the access is made to the data held in the cache, and a cache invalidation unit that compares a time of last access to the data held in the cache, recorded in the access time recording unit with a invalidation reference time received and that selectively invalidates data with a time of the last access anterior to the invalidation reference time, at a preset timing or a trigger before the data is not accessed.

In another aspect of the present invention, there is provided a management apparatus connected to a plurality of nodes, each of which includes a cache that temporarily holds data in a storage shared by the nodes, wherein the management apparatus receives a notification about start of execution of a data access process from the node, wherein the management apparatus comprises:

an execution node change detection unit that detects a change of the node executing the data access process;

an execution node recording unit that records information concerning the node of execution of the data access process;

a time recording unit that records a time the data access process is executed last time in the node executing the process, a processing arrangement unit that sets a location of the process so that a plurality of data access processes sharing the data will be sequentially executed in the same node, and an invalidation notification unit that informs the node about invalidation of data held in the cache of the node, and that informs the node about a time of the change of the nodes that execute the data access process.

According to the present invention, there is also provided a method for controlling a cache comprising:

recording information concerning a time when a data access process migrates from one node of a plurality of nodes to other node, each node including a cache in which the data stored in a storage shared by the nodes is held temporarily; and after migration of the process, the one node that is a source node of the migration, selectively invalidating, out of data held in the cache of the one node, data accessed at least by the process on the one node with a time of last access thereto by the process being older than a time of the migration of the process from the one node to the other node, at a preset timing or with a preset trigger.

In a further aspect of the present invention, there is provided a program that causes a computer constituting a node apparatus including a cache that temporarily holds data of a storage shared by a plurality of node apparatus to execute the processing comprising:

a access time recording processing that records an access time each time access is made to data held in the cache; and a cache invalidation processing that compares the last access time to data held in the cache, recorded by the access time recording processing with a invalidation reference time received and that invalidates the data with the last access time anterior to the reference time, at a preset timing or a trigger before the data is accessed. According to the present invention, there is provided a non-transitory computer readable medium storing therein the program, such as a semiconductor memory or a magnetic/optical disc.

According to the present invention, in a system comprised of a plurality of nodes, each including a cache for a shared storage, it is possible to reduce the amount of data to be invalidated to maintain cache coherency so as to suppress the performance from being lowered.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 is a diagram illustrating a configuration of a node according to the exemplary embodiment of the present invention.

FIG. 3A and FIG. 3B are diagrams illustrating last access time tables according to the exemplary embodiment of the present invention.

FIG. 5 is a diagram illustrating an execution node table according to the exemplary embodiment of the present invention.

FIG. 6 is a diagram illustrating a node execution completion time table according to the exemplary embodiment of the present invention.

FIG. 11 is a diagram illustrating a node completion time table in an initial state according to an embodiment of the present invention.

FIG. 12 is a diagram illustrating a execution node table in a state after once changing the VM execution node according to an embodiment of the present invention.

FIG. 13 is a diagram illustrating a node execution completion time table in a state after once changing the VM execution node according to an embodiment of the present invention.

FIG. 14 is a diagram illustrating a last access time table according to an embodiment of the present invention.

FIG. 19 is a diagram illustrating an example of storage cache management information.

DETAILED DESCRIPTION

Figure 15:
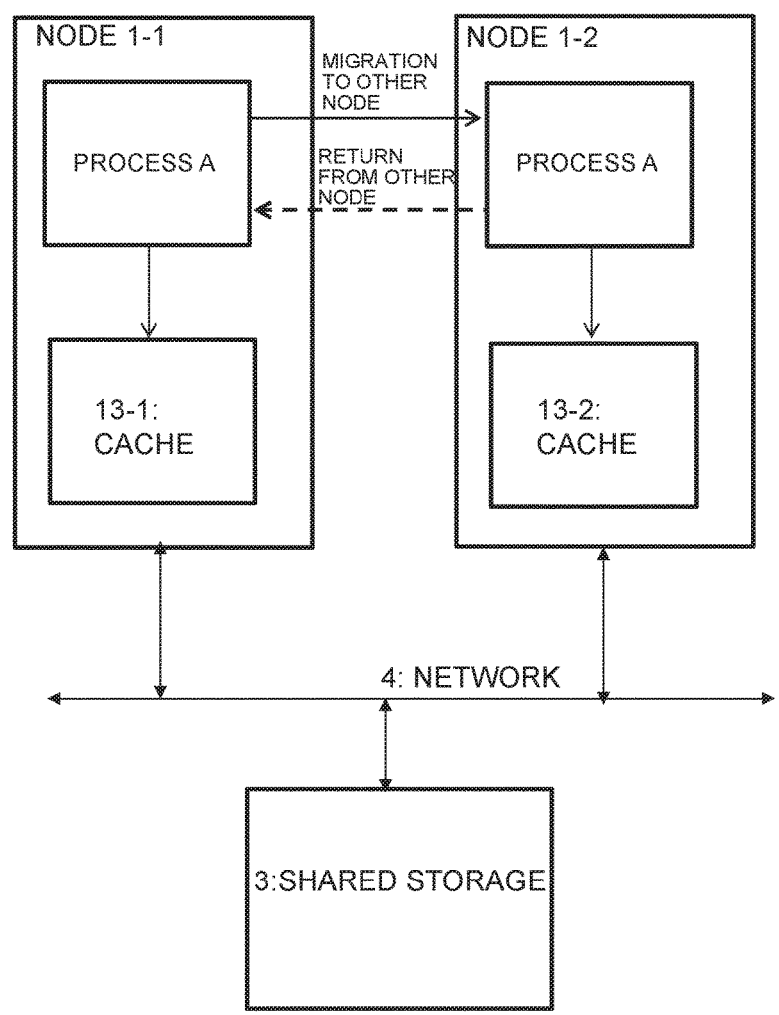
FIG. 15 is a diagram for illustrating an operating principle according to the present invention.

Preferred exemplary embodiments of the present invention will now be explained. Referring to FIG. 15, an information processing system in one aspect of the present invention at least includes a plurality of nodes (nodes 1-1 and 1-2) and a storage 3 shared by the nodes. These nodes (1-1, 1-2) include caches 13-1 and 13-2 for temporarily storing data of the shared storage 3. Although FIG. 15 illustrates only two nodes 1-1 and 1-2 only for simplicity, three or more nodes may, of course, be used. In one aspect of the present invention, the process of accessing cache data or data of both the cache and the storage, inclusive of the process by implemented virtual machines (VMs), may be moved (migrated) between the different nodes.

In one aspect of the present invention, the time of migration of a data access process, such as processing of updating cache data (e.g., process A), executed by a given node, such as node 1-1, from the node 1-1 to another node, such as node 1-2, is recorded. In the node 1-1, from which the above mentioned access process (process A) has migrated to the other node 1-2, data that is held in the cache (13-1) of the node (1-1) and the last access time to which by the access process (process A) in the one node (1-1) before migration of the process from the one node to the other node (1-2) is older than the time of migration of the process from the one node (1-1) to the other node (1-2) is selectively invalidated. The one node (1-1) performs the invalidation of the data at a preset timing or a trigger subsequent to the migration of the access process (process A) to the other node (1-2) before the data in the cache 13-1 of the node 1-1 is again accessed (access by referencing or updating). The invalidation in the cache may be controlled by a cache controller (not shown in FIG. 15), provided in the node 1-1, a controller (not shown), in the cache (13-1), or by a co-operation with a management unit (controller), also not shown, connected to the node 1-1. In the following, such a case in which the access process (process A), executed on the node 1-1, as a source node, is migrated to the node 1-2 for execution therein and subsequently returned directly to the source node 1-1, will be described, only by way of an example (The operation of returning the process A from the node 1-2 to the source node 1-1 via another node, also not shown, may be carried out in similar manner).

In the node 1-1, data invalidation for maintaining cache coherency in the cache 13-1 is carried out after a time T1 when the process A has migrated from the node 1-2 to the node 1-1. A time T0 when the process A migrated in the past from the node 1-1 to the node 1-2 (a time stamp of an hour, a minute and a second of a day of a month in a year A.D., only as an example), is compared with a time of last access by the process A in the node 1-1 to data held in the cache 13-1 before migration of the process A from the node 1-1 to the node 1-2 (a time stamp of an hour, a minute and a second of a day of a month in a year A.D., only as an example). From among a plurality of items of data stored the cache 13-1, such data with the last access time being older than the time (T0) when the process A migrated to the node 1-2 in the past (cache page) is invalidated. Such data may be invalidated in a lump in the node 1-1. Or, such data that is held in the cache 13-1 in the node 1-1 and the last access time to which in the node 1-1 by the process A before its migration to the node 1-2 is older than the time T0 when the process A migrated to the node 1-2 from the node 1-1 may be invalidated with reception of an access request to the data as a trigger individually (each time an access request is made to the data). The time when the process migrates between nodes may be recorded by a management unit, such as a management node, not shown, each time the process migrates. It may be that the process A is migrated from the node 1-1 to the node 1-2 and thence to a plurality of other nodes, not shown, so as to be then returned to the node 1-1. In such a case, the node 1-1 again invalidates, after the time when process A returned to the node 1-1, the data (page) which is held in the cache 13-1 of the node 1-1 and the last access time to which is older than the time T0 when the process A migrated to the node 1-2 in the past, in a manner similar to that described above. It may also be that the process A is migrated further to another node, not shown, from the node 1-2, and thence returned to the node 1-2. In such a case, such data which is held in a cache 13-2 of the node 1-2 and the last access time to which by the process A in the node 1-2 before its migration to the other node (not shown) is older than the time when the process A further migrated from the node 1-2 to the other node is invalidated.

<Inter-Node Migration of Access Process and Control of Cache Invalidation>

Figure 16A:
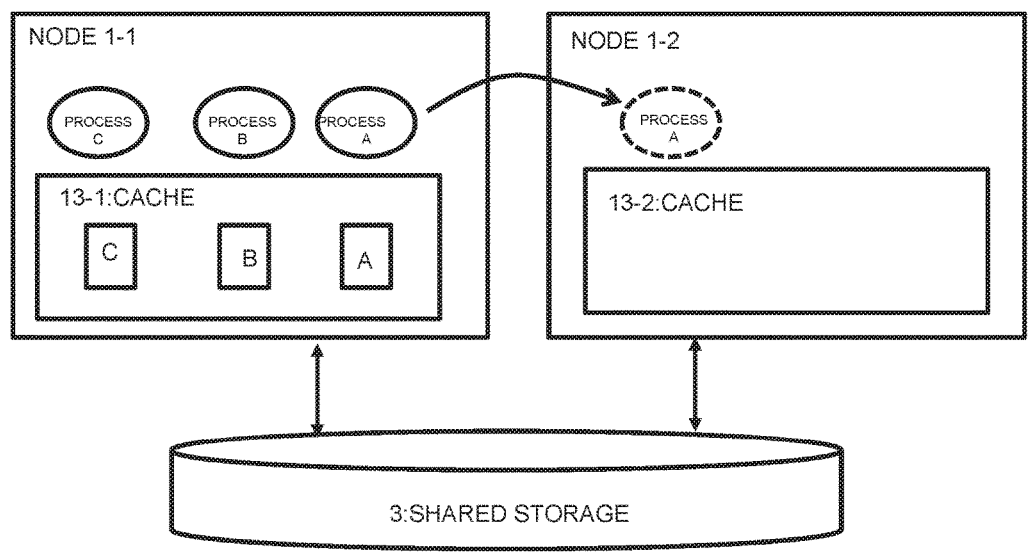
FIG. 16A and FIG. 16B are diagrams for illustrating an operating principle according to the present invention.
Figure 16B:
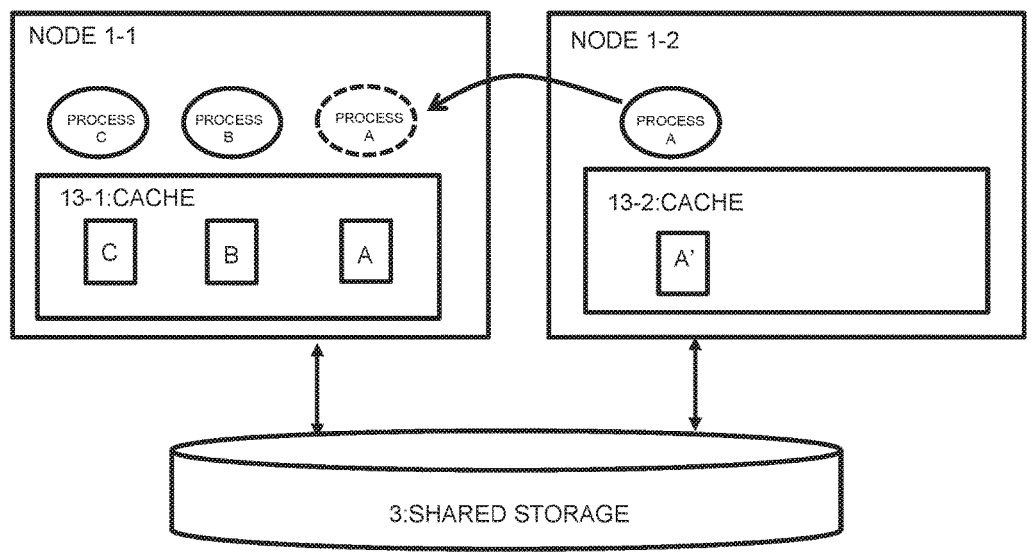
Figure 17:
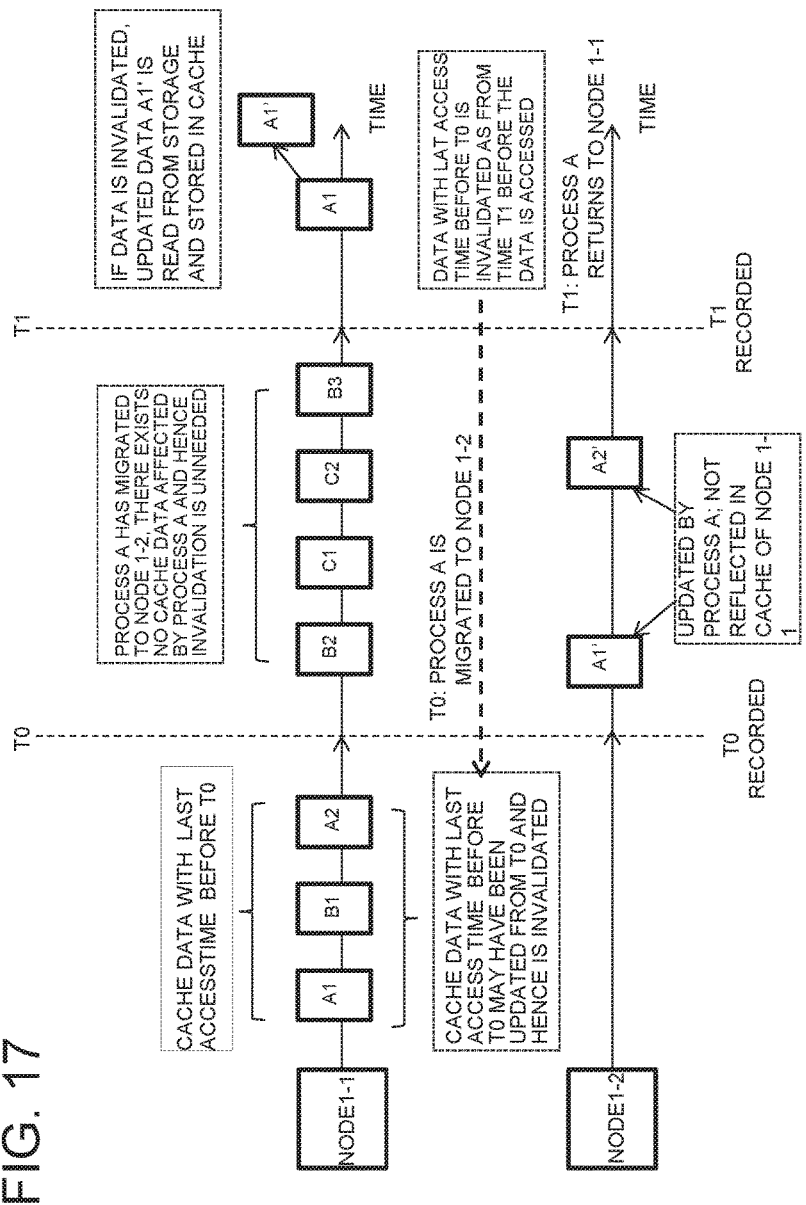
FIG. 17 is a diagram for illustrating an operating principle according to the present invention.
Figure 18:
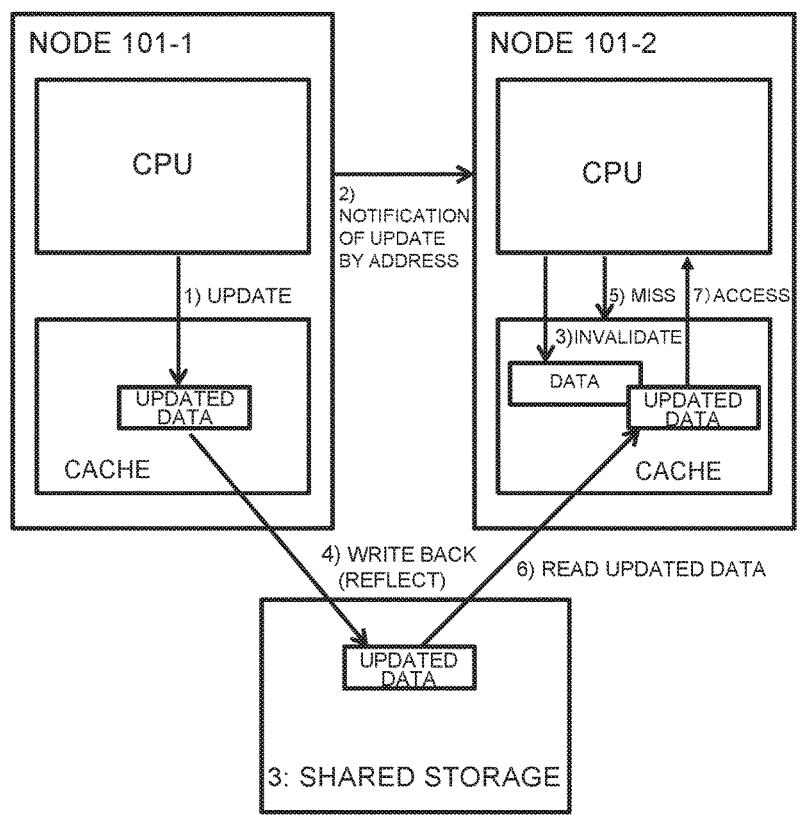
FIG. 18 is a diagram for illustrating cache coherency maintenance.

FIG. 16A, FIG. 16B and FIG. 17 are schematic diagrams for illustrating migration of the access process and cache control in the nodes shown in FIG. 15. FIG. 17 depicts a timing diagram schematically illustrating the time of migration of the process A of FIG. 16A and FIG. 16B, the referencing as well as update of data by each processing, and invalidation/non-invalidation of data. Referring to FIGS. 16A and 16B, it is assumed that data access process A, B and C can be executed in any of the nodes 1-1 and 1-2 and that, in an initial state, each process is executed at the node 1-1.

The process A is migrated at time T0 from the node 1-1 to the node 1-2, as shown in FIG. 16A, and subsequently migrated at time T1 from the node 1-2 to the node 1-1, as shown in FIG. 16B.

If the process A has migrated at time T0 from the node 1-1 to the node 1-2, the data stored by the process A in the node 1-1 into the cache (13-1 of FIG. 15), that is, the data A1 and A2 of FIG. 17, are not accessed by any process being executed in the node 1-1. Thus, the last access time to these data is necessarily anterior to the time T0 the process has migrated from the node 1-1 to the node 1-2. On the other hand, the data held in the cache (13-1 of FIG. 15) by other processes B and C of FIG. 16, executed in the node 1-1, are accessed by these other process (process B, C) even after migration of the process A from the node 1-1 to the node 1-2. Hence, the last access time to these other process is updated and becomes temporally posterior to the migration time T0 of the process A. That is, when the process A has been returned to the node 1-1 at time T1, data that exist in the cache (13-1 of FIG. 15) in the node 1-1 and that has been accessed last time subsequent to the time T0 of migration of the process A, namely data B2, C1, C2, B3 of FIG. 17, are not data accessed by the process A in the node 1-1. These data B2, C1, C2, and B3 of FIG. 17, held in the cache (13-1 of FIG. 15) of the node 1-1, may not be updated in other than the node 1-1. It is thus unnecessary to invalidate the data with the last access time temporally posterior to the time T0 of migration of the process A, namely the data B2, C1, C2, and B3 of FIG. 17, in the cache (13-1 of FIG. 15) of the node 1-1.

Among a plurality of items of data held in the cache (13-1 of FIG. 15) of the node 1-1, the data with the last access time anterior to T0, are data held in the cache (13-1 of FIG. 15) of the node 1-1 before migration of the process A to the node 1-2, and hence may have been updated by the process anterior to the migration to the node 1-2. Hence, these data need to be invalidated for maintaining cache coherency. Thus, in a node (such as node 1-1), the last access time to the data in the cache (13-1 of FIG. 5) and the time (T0) of migration of the process A in the past to another node (such as node 1-2), are compared to each other, and such data with the last access time being anterior to the time (T0) of migration are taken to be subject to invalidation. By so doing, the amount of the data to be invalidated in the cache (13-1 of FIG. 15) of the node 1-1 may be decreased to prevent the cache performance (access performance) from being deteriorated. Whenever each process is migrated between different nodes, the times of migration, such as the time of migration T0 the process A in FIG. 16A is migrated from the node 1-1 to the node 1-2 or the time of migration T1 the process A in FIG. 16B is migrated from the node 1-2 to the node 1-1, are recorded.

In the cache (13-1 of FIG. 15) of the node 1-1, data (such as data B1 of FIG. 17) that is accessed by a process other than the process A (such as process B), may also be the subject of the invalidation, provided that the condition that the last access time to the data is anterior to the time T0 is met. In such a case, it may be conceived that in the cache (13-1 of FIG. 15) of the node 1-1, cache data which could inherently hit is invalidated as a result of invalidation of data, such as data (B1 of FIG. 17) accessed by the process B other than the process A, thus possibly deteriorating the cache performance (access performance). However, in this case, the data invalidated in the cache (13-1 of FIG. 15) of the node 1-1 is data with the last access time being anterior T0 and, in short, may be said to be data not accessed even only once during a time when the process A is being executed in the other node 1-2 (that is, during a time period from time T0 until time T1). Thus, the data invalidated in the cache (13-1 of FIG. 15) of the node 1-1 may be said to be data with a lower access frequency. Though depending on the frequency of migrations of a process among the nodes, it may be said that since the data made to be the subject of the invalidation is the data with a low access frequency, the effect of lowering of the access performance due to the invalidation could be sufficiently suppressed.

Referring to FIG. 17, before the time T0, e.g., data A1 and A2, accessed by the process A, are held in the cache (13-1 of FIG. 15) of the node 1-1 (while B1 is data stored by the process B in the cache (13-1)). When the data A1 and A2, held in the cache, are data updated by a write access of the process A, the so updated data A1 and A2 are written back to the shared storage (3 of FIG. 15 and FIG. 16) so as to reflect the update content.

At the time T0, the process A is migrated to the node 1-2. This time T0 is recorded by e.g., a management node, not shown. After the time T0, the data A1 and A2 are updated in the node 1-2 by the process A migrated thereto so that data A1' and A2' updated are stored in a cache (13-2 of FIG. 15). The updated data A1' and A2' are written back to the shared storage (3 of FIG. 15 and FIG. 16) so as to reflect the update content. On the other hand, data B2, C1, C2 and B3 are held in the cache (13-1 of FIG. 15) in the node 1-1 but are not affected by the process A. Thus, even when the cache (13-2 of FIG. 15) is updated in the node 1-2, in the node 1-1, the invalidation for maintaining cache coherency in the cache (13-1 of FIG. 5) is not needed.

At the time T1, the process A returns to the node 1-1 from the node 1-2. In this node 1-1, a node of the destination of migration, data which is held in the cache of the node 1-1 (cache 13-1 of FIG. 15) and the last access time to which in the node 1-1 by the process A before migration from the node 1-1 to the node 1-2 in the past is older than the time T0 the process A was migrated from the node 1-1 to the node 1-2, is invalidated. That is, from the time (T1) when the process A has migrated from the node 1-2 to the node 1-1, the data in the cache of the node 1-1 (cache 13-1 of FIG. 15), the last access time to which in the cache (13-1 of FIG. 15) in the node 1-1 anterior to T0, is invalidated. The reason is that the data with the last access time anterior to T0 in the cache (13-1 of FIG. 15) in the node 1-1, may have been updated by the process A in the node 1-2 as from T0. It is noted that the cache data B1 in the cache (13-1 of FIG. 15) in the node 1-1, which is not data accessed by the process A, may be also invalidated, because the last access time to such cache data is anterior to T0. When the data A1 (a cache page storing the data A1) has been invalidated in the cache (13-1 of FIG. 15) in the node 1-1, access to the data A1 result in a cache miss. The updated data A1' (data updated when the process A is being executed in the node 1-2) is read from the shared storage (3 of FIG. 15) and held in the cache (13-1 of FIG. 15).

In a mode according to the present invention, even in such a case where e.g., the mapping of address space in the shared storage for data held in the cache differs from one node to another, such that it is impossible to identify data updated in another node using an address of the storage location in the shared storage, it is not the entire data in the cache that is invalidated to maintain cache coherency. That is, the data held in the cache is selectively invalidated to reduce the amount of data invalidated, thereby decreasing an adverse effect of deterioration of performance, otherwise caused by cache invalidation. Specifically, when a process accessing data is migrated from one node to another, the time of last access to the data stored in a cache in a source node of migration is compared with the time when the process in the past migrated from the source node of the migration to another node (invalidation reference time) and data with the last access time older than the reference time is selectively invalidated. By so doing, it is unnecessary to invalidate the entire cache even when mapping of a logical address space of the shared storage (virtual address space) to a physical space of a recording medium differs from one node to another, thereby reducing the amount of data to be invalidated.

<Execution of Processing in a Single Node>

In a mode according to the present invention, a data access process is preferably set so as to be executed at all times in a single node. For example, a plurality of nodes do not access the same data simultaneously. In such a case, data in the shared storage is accessed at all times from a single node and the data is stored only in a cache of the single node. There is no necessity that the single node accessing the data is a fixed node, but may be changed from one node to another node. In this case, when a write access is made to data stored in a cache of a single node, there is no necessity to perform cache invalidation in another node. In the example in FIG. 15, if a node executing data access process in the cache or the storage is changed from the first node 1-1 to the second node 1-2, the data in the shared storage 3 is accessed at all times from the second node 1-2, and a copy or an update content of data in the shared storage 3 is stored only in the cache 13-2 in the first node 1-2.

In such a cache configuration in which data are shared among a plurality of nodes, each time data stored in a cache of one node is updated, it is necessary to invalidate the data stored in a cache of another node. This is not the case with the mode according to the present invention, in which data is accessed from a single node and stored only in a cache of the single node, so that there is no necessity to invalidate a cache of a node, each time data stored in a cache of another node is updated.

Referring again to FIG. 15, in the case wherein the node executing the process A is changed from the node 1-1 to the node 1-2, the data accessed by the process A in the source node 1-1 of migration is held in the cache 13-1 of the node 1-1. Similarly, the data accessed by the process A in the destination node 1-2 of migration is held in the cache 13-2 of the node 1-2. It may be that nodes 1-1 and 1-2 are of the same mapping (correspondence between a logical address space and a physical address) for an address of a storage location in the shared storage 3. If, in such case, the process A has accessed data having the same address of a storage location in the shared storage 3 in each of the source node of migration 1-1 and the destination node of migration 1-2, the same data are held in the cache 13-1 of the node 1-1 and the cache 13-2 of the node 1-2. When the data is updated in the cache 13-2 of the destination node 1-2 of migration of the process A, the data update is reflected only in the cache 13-2 of the node 1-2, while data before migration of the process A to the node 1-2 (data before node-change) is left held in the cache 13-1 of the source node of migration. In order to resolve such a state so as to maintain cache coherency between the cache 13-1 of the node 1-1 and the cache 13-2 of the node 1-2, pre-update data held in the cache 13-1 of the node 1-1 (that is, data not reflecting the update) is invalidated. Thus, when a process (e.g., a virtual machine) has migrated from one node to another node and data of the cache of the other node is updated, it becomes necessary to invalidate data of the cache of the one node.

It may be that, as described above as the problem of the related technique, the mapping for an address for storage location in the shared storage differs from one node to another, such that it is impossible to uniquely identify data that is updated in the destination node of migration of the access process, in the source node of migration. In such a case, in order to maintain cache coherency, invalidation of all data held in the cache of the node other than the destination node of migration (source node of migration) is performed. It is because the data may have been updated in the destination node of migration. However, such invalidation of the entirety of the cache may give rise to deterioration in the performance.

In order to prevent the performance from becoming deteriorated by invalidation as well as to maintain cache coherency, it is necessary to decrease a frequency of operations of invalidation of data held in the cache as well as the amount of data in the cache to be invalidated <Selection of the Node in which to Execute Invalidation of Data in the Cache: Source Node of Migration>

In a mode according to the present invention, only cache invalidation is performed only in a node where cache coherency is most likely to have been lost. That is, when an access process executed on one node has migrated to another node, only data held in the cache of the source node of migration of the access process is invalidated.

<Reduction of an Amount of Data Subjected to Cache Invalidation>

In a mode of the present invention, in order to reduce the amount of invalidation of data stored in a cache of a source node of migration at the time of inter-node migration of the access process, a time of migration of the access process from the source node of migration to another node is recorded. The time of migration is recorded in a memory, such as a management node connected for communication to the source node of migration. Moreover, the time of the last access by the access process to data held in the cache of the node executing the access process is stored in the node. That is, each time the data held in the cache of the node is accessed by the access process executed in the node, the time of access to the data is updated (When there is no more access to the data, the access time last updated becomes the last access time). The time of the last access by the access process to data held in the cache of the node may be held in the cache in association with the data. In the source node of migration, in which data invalidation is to be performed to maintain cache coherency, the time of last access to the data held in the cache of the node is compared with the time of migration of the access process from the source node of migration to the other node. By so doing, selective invalidation only to data left after excluding data in a state with cache coherency being maintained (that is, data detracting from cache coherency) is performed.

When the process A (access process) migrates from the node 1-1 to the other node 1-2, in FIG. 15, in the cache 13-1 of the node 1-1 as the source node of migration, the last access time of data accessed by the process A in the node 1-1 before migration to the node 1-2 is necessarily anterior to (older than) the time of migration of the process A from the node 1-1 to the node 1-2.

<Reduction of the Frequency of Cache Invalidation>

In the case wherein a node executing a first access process is changed from the node 1-1 to the node 1-2, and a node executing a second access process having data in common with the first access process is a node other than the node 1-2, in a mode according to the present invention, the node executing the second access process is changed to the node 1-2 to which the first access process has migrated, so as to maintain cache coherency and to reduce the frequency in performing invalidation of data held in the cache to a minimum. If the second access process is not migrated to the node 1-2 but is executed in a node other than the node 1-2, and the data is updated, there may arise a situation in which, to maintain cache coherency, it becomes necessary to invalidate data not only in the source node 1-1 of migration but also in the node 1-2 executing the first access process. In such a case, according to the mode of the present invention, the second access process is not executed in a node other than the node 1-2, but is migrated to the second node 1-2, in which both the first access process and the second access process are executed to update the common data. By so doing, it is only in the source node 1-1 of migration that the data is invalidated in order to maintain cache coherency. The frequency of invalidation for maintaining cache coherency may thus be reduced.

<Reducing the Amount of Data Invalidation in Cache: Cache Control in the Source Node of Migration>

Referring to FIG. 15, data (B2, C1, C2, and B3 of FIG. 17) that are accessed in the cache 13-1 of the source node 1-1 of migration, after migration of the process A (access process) from the node 1-1 to the node 1-2 are exempted from the subject of invalidation. In short, in invalidating cache data, the data accessed in the cache 13-1 of the source node 1-1 of migration after the process A has migrated from the node 1-1 to the node 1-2 is not accessed from the process A in the destination node 1-2 of migration. It is thus possible to exempt the data that has been accessed in the cache 13-1 of the source node 1-1 of migration after the migration of the process A (access process) from the subject of the invalidation.

The higher the frequency of access to data, the higher is the probability of access on the cache 13-2 being made by the process A executed in the destination node 1-2 of migration after the node executing the process A (access process) is changed from the node 1-1 to the node 1-2. Thus, exempting the data in the cache 13-1 of the source node 1-1 of migration from the subject of invalidation is highly effective in decreasing the adverse effect of deterioration of the access performance brought about by cache invalidation.

<Control of Delaying Cache Invalidation>

To decrease further the amount of data to be invalidated in a cache, the time of cache invalidation for maintaining cache coherence may be retarded to the maximum extent possible. It is supposed that the node executing the access process (process A) is changed from the node 1-1 to the node 1-2, the data in the cache 13-2 of the destination node 1-2 of migration of the access process is updated and pre-update data is left as it is in the cache 13-1 of the source node 1-1 of migration. In such a case, cache coherency keeps on to be maintained as long as the pre-update data is not referenced. In short, if the pre-update data held in the cache 13-1 of the node 1-1 is invalidated at some time before the access process (process A) is returned to the node 1-1 and executed, cache coherency may be maintained. Therefore, each time the access process (process A) is returned to the node 1-1 to access the data in the cache 13-1 (the time of last access to which by the access process (process A) in the cache 13-1 before its migration to the node 1-2 is older than the time (T0) of migration of the process A from the node 1-1 to the node 1-2), it is possible to invalidate the data in the cache 13-1 (at a time directly before execution of access to the data). Since the change of the node executing the access process is often accompanied with an overhead, such change of the node executing access process is not made so often.

Therefore, the last access time is updated if the access to data in the cache of the node having a higher access frequency is made while the above mentioned access process is being executed in the other node (node 1-2 of FIG. 15).

The invalidation of data held in the cache 13-1 of the source node 1-1 of migration, after the access process (process A) migrating to another node, may be performed at any time when there has arisen the possibility of the invalidated data being erroneously accessed. It is also possible to invalidate the data held in the cache 13-1 of the node 1-1 after the access process (process A) has migrated at the time T0 to the other node 1-2 and is in a position to access data in the cache 13-2 of the node 1-2. It is likewise possible to invalidate for example, only data not accessed even once in the cache 13-1 of the source node 1-1 of migration, that is, the data of only low access frequency.

<Mode of System>

Figure 4:
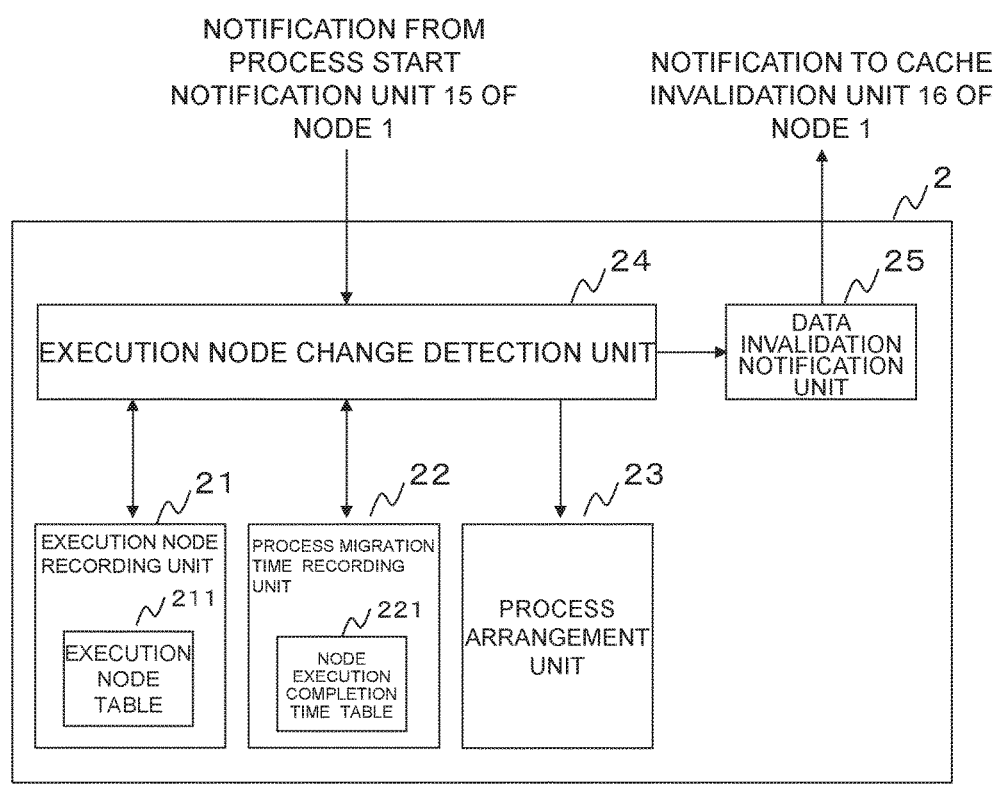
FIG. 4 is a diagram illustrating a configuration of a management node according to the exemplary embodiment of the present invention.

In a mode according to the present invention, a configuration to maintain cache coherency includes:

means that records a time of last access to data held in a cache of a node (an access time recording unit 14 of FIG. 2);

means that notifies a start of execution of a data access process to cache data in the node (a process start notification unit 15 of FIG. 2);

means that detects a change of a node executing the data access process (execution node change detection unit 24 of FIG. 4);

means that records information on the node executing the data access process (execution node recording unit 21 of FIG. 4);

means that records a time the data access process was executed last time in a node (a process migration time recording unit 22 of FIG. 4);

means that arranges process so that a plurality of data access processes sharing data will be executed in the same node (process arrangement unit 23 of FIG. 4);

means that notifies a node of invalidation of data held in the cache of the node (a data invalidation notification unit 25 of FIG. 4); and means that receives a notification from the means that notifies invalidation and that invalidates data with an older last access time in a node cache (a cache invalidation unit 16 of FIG. 2).

The means that records a time of last access to data stored in a cache of a node (access time recording unit 14) records or updates the information concerning the time of last access by a process within the node to data held in the cache of the node, each time the data is accessed from the process in the node.

The means that notifies the start of execution of a process in the node (process start notification unit 15) detects a start of execution of a new access process in a node. The process start notification unit 15 also informs the means that records the node executing the access process and the means that records the time of last access in the node about the start of execution of access process detected.

The means that detects a change of a node executing data access process (execution node change detection unit 24) is responsive to the notification from the means that notifies the start of execution of a process in the node (process start notification unit 15) to decide whether or not the node executing the process (node of execution) as the generation source of the notification has been changed. If the result of the decision indicates that the node of execution has been changed, the execution node change detection unit 24 instructs updating the information about the node of execution and the information about the time the process was executed last time in the previous node of execution.

The means that records the node executing the data access process (execution node recording unit 21) records the information concerning the node of execution of the access process executed in the information process system. The execution node recording unit 21 also returns the node of execution of the access process in response to an inquiry from the execution node change detection unit 24. The execution node recording unit 21 also updates the information concerning the node of execution recorded based on the information concerning the new node of execution of the access process as detected by the execution node change detection unit 24.

The means that records a time the data access process was executed last time in a node (process migration time recording unit 22) records the time of completion in the node of the process executed in the information process system (the time of completion of the execution in the node).

The means that records a time the data access process was executed last time in a node (process migration time recording unit 22) returns the time of completion of execution of the access process in the node in response to an inquiry from the means that detects a change of a node executing data access process (execution node change detection unit 24).

Furthermore, the means that records a time the data access process was executed last time in a node (process migration time recording unit 22) also updates the time of completion of execution in a previous execution node as specified by the execution node change detection unit 24 in connection with the process the change of the execution node of which was detected by the means that detects a change of a node executing the data access process (execution node change detection unit 24).

When a change of a node of execution executing an access process is detected by the execution node change detection unit 24, the means arranging process (process arrangement unit 23) changes the node of execution for the process to another execution node for a process sharing data with the first-stated process so that two access process will be executed by the same node.

The means that notifies a node about invalidation of data stored in a cache of the node (data invalidation notification unit 25) is responsive to the notification from the execution node change detection unit 24 to inform the node specified by the notification that the data accessed before the time specified is invalid.

The means that invalidates data of older last access time (cache invalidation unit 16) is responsive to the notification from the invalidation notification unit 25 to invalidate the data the time of the last access to which recorded in the access time recording unit 14 in the node cache is anterior to the time specified in the notification. By so doing, the invalid data ceases to be held in the cache.

According to the present invention, in an information process system comprised of a plurality of nodes and a storage shared by the nodes, each node including a private cache for the shared storage, it is possible to reduce the frequency of cache invalidation events as well as the amount of data to be invalidated, in comparison with the case (Comparative Example) to which the present invention is not applied, even when data updated in another node cannot be identified from the data held in the cache of a node. As a result, it is possible to reduce adverse effects of deterioration of access performance otherwise caused by cache invalidation.

Exemplary Embodiments

Figure 1:
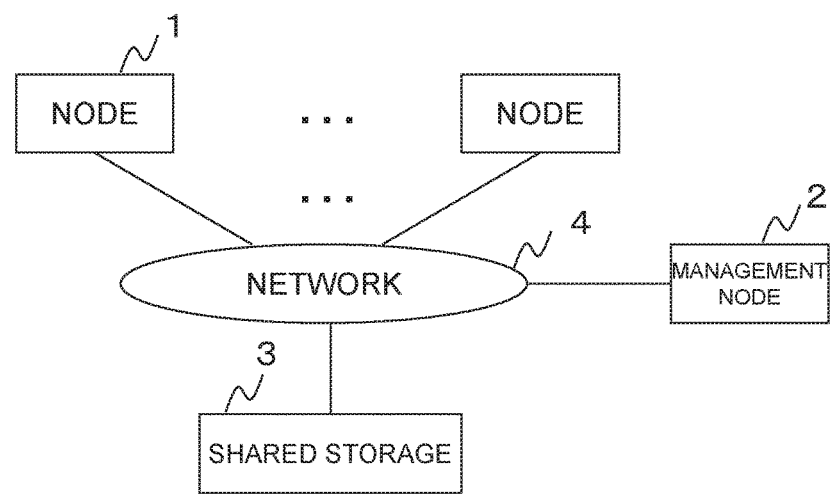
FIG. 1 is a diagram illustrating a total system configuration according to an exemplary embodiment of the present invention.

A system configuration according to the present invention will now be described with reference to the drawings. Referring to FIG. 1, the configuration of the system of an exemplary embodiment 1 includes two or more nodes 1, where one or more processes are executed to perform access to data in a shared storage. The system configuration also includes a management node 2 where the process executed on the nodes 1 is managed, a shared storage 3 made up of one or more recording mediums and a network 4 interconnecting the nodes 1, management node 2 and the shared storage 3. The shared storage 3 is made up of one or more hard disk (HDD: hard disk drive) devices. It may also be made up of a plurality of units connected to the network 4 or a system (distributed storage system). Although the node 1 and the management node 2 are illustrated separated from each other in the system configuration in FIG. 1, the management node 2 may be run partially or in its entirety on the same device as the node 1.

FIG. 2 illustrates a configuration of the node 1. Referring to FIG. 2, the node 1 includes a process 11, a new process 12, a cache 13, an access time recording unit 14, a process start notification unit 15 and a cache invalidation unit 16. The access time recording unit 14, process start notification unit 15 and the cache invalidation unit 16 make up a controller 17. The controller 17 and the cache 13 may, of course, be integrated into a unit.

The process 11 is a single process or a plurality of processes under execution. The process 11 denotes for example, a process or a thread, executed on an operating system, not shown, or a virtual machine (VM) executed on a hypervisor, not shown. The process 11, executed in the node 1, makes access to data stored in the shared storage 3.

The new process 12 denotes a process just newly started in the node 1. The new process 12 lies in a wait until start of execution is allowed by the cache invalidation unit 16. After the wait comes to a close, the new process is changed to the process 11. In the case of FIG. 16A, the new process 12 corresponds to process that migrated from the node 1-1 to the other node 1-2 at time T0. In the case of FIG. 16B, the new process corresponds to process A returned at the time T1 to the source node 1-1 from the node 1-2.

The cache 13 is made up for example, of a clock synchronized fast DRAM or SSD. The cache 13 temporarily stores data stored in the shared storage 3 so that the data will be read or written by the process 11 executed in the node 1.

Each time data held in the cache 13 is accessed by the read access or the write access from the process 11, the access time recording unit 14 records the time the access has been made (last access time). The access time recording unit 14 includes a last access time table 141 in which to record the time of access to data held in the cache 13. The access time, recorded in the last access time table 141, is taken to be the last access time until the data is again accessed. If the data ceases to be accessed in the source node of migration, due to migration of the process to another node, as an example, the so recorded access time is established as the last access time.

FIG. 3A illustrates an example of the last access time table 141. The last access time table 141 is comprised of a data identifier 1411 for uniquely identifying data as a management unit in the cache 3 and a last access time 1412 for data associated with the data identifier 1411.

The data identifier 1411 differs in its form depending on a management unit of data held in the cache 13. If, for example, the data is managed with a page as a unit, wherein the recording area in the cache 13 is divided into pages with a constant capacity (a page size), the data identifier 1411 is a page address indicating a page containing the pertinent data (see FIG. 19). If data of the shared storage 3 is managed in the cache 13 in terms of a file as a unit, the data identifier 1411 uniquely identifies a file, such as a file name including the data (path name of a file system). In the case of FIG. 3A, "0x" at the leading end of a character string indicates a hexadecimal notation. The page address is expressed by 10 Hex digits (40 bits). It is noted that, if the data identifier 1411 is managed in terms of a page as a unit, the column of the last access time 1412 of the last access time table 141 may be included in for example, a cache management table (see FIG. 19) an may be arranged to such a configuration shown in FIG. 3B.

The process start notification unit 15 of FIG. 2 detects start of the new process 12 and issues notification to the management node 2 (FIG. 1) for notifying that the new process is started. The notification includes an identifier for uniquely identifying the new process 12.

The cache invalidation unit 16 receives a notification concerning invalidation of cache from the management node 2. If the node of execution of the new process 12 (FIG. 2) is changed to the node 1, and the management node 2 has detected that the new process 12 was formerly executed in the node 1, the management node 2 notifies the cache invalidation unit 16 of the node 1 as to invalidation of the cache. The cache invalidation unit 16 compares the time information contained in the notification received from the management node 2 (FIG. 1), for example, the time information indicating the time the node of execution of the new process 12 (FIG. 2) was changed from the node 1 to another node, with the time 1412 of last access to data held in the cache 13. The last access time may be obtained from the last access time table 141 stored in the access time recording unit 14. The cache invalidation unit 16 instructs the cache 13 to invalidate data anterior to the time specified in the notification received from the management node 2 (FIG. 1). The cache 13 invalidates the data stored therein as instructed by the cache invalidation unit 16. An invalidate flag in the cache management table, shown for example in FIG. 3B, is set to 'on'.

Referring to FIG. 4, FIG. 5 and FIG. 6, the configuration of the management node 2 is now explained. FIG. 4 illustrates the configuration of the management node 2. Referring to FIG. 4, the management node 2 includes an execution node recording unit 21, a process migration time recording unit 22, a process arrangement unit 23, an execution node change detection unit 24 and a data invalidation notification unit 25.

The execution node recording unit 21 records information uniquely identifying the node 1 currently executing the process 11 (see FIG. 2). The execution node recording unit 21 includes an execution node table 211 that records the node 1 executing the process 11 (see FIG. 2).

FIG. 5 illustrates an example of a table format of the execution node table 211 of FIG. 4. The execution node table 211 includes a process identifier 2111 for uniquely identifying the process 11 (see FIG. 2) executed in each node contained in the system, and an execution node identifier 2112 for uniquely identifying the node executing the process corresponding to the process identifier 2111.

The process migration time recording unit 22 of FIG. 4 records the time of completion of each process 11 (see FIG. 2) executed in each node 1 of the entire system (time of completion of execution in each node). The process migration time recording unit 22 includes, for each process 11 (see FIG. 2), a node execution completion time table 221 that records the time of completion of execution in each node 1.

FIG. 6 illustrates an example of a table format of the node execution completion time table 221 of FIG. 4. The node execution completion time table 221 includes a process identifier 2211 for uniquely identifying the process 11 (see FIG. 2) executed in each node contained in the system and a node execution completion time 2212 in the node 1 associated with each process identifier 2211. The node execution completion time table 221 manages, in association with the process identifier 2211, the node execution completion time 2212, a number of which is equal to the number of the nodes 1 (see FIG. 1). In the example of FIG. 6, the node execution time 2212 for a plurality of nodes 1 (nodes 001, 002, see FIG. 1) are respectively stored in association with the process identifiers 2211.

The node execution completion time 2212 is stored in the node execution completion time table 221, when the new process 12 (see FIG. 2) has started to be executed in the node 1.

In the case wherein the new process 12 (see FIG. 2) is the process 11 (see FIG. 2) directly following the change of the execution node, the node execution completion time 2212 for the node 1 that has not ever executed the process 11 is not stored in the node execution completion time table 221.

In the case wherein the node execution completion time 2212 for the process 11 is not present, the time information indicating such absence of the node execution completion time 2212 is stored as the node execution completion time 2212 (see FIG. 6). In FIG. 6, for example, the time (1970 Jan. 1 00:00:00.000), anterior to the system operation start time, is stored as the node execution completion time 2212 for the process 11 with the process identifier 2211 of '1002' to indicate that the process 11 (see FIG. 2) has not ever been executed in the node 1 represented by the identifier node 002. Or, the flag information indicating that the process 11 (FIG. 2) has not ever been executed in the node 1 may be provided in the node execution completion time table 221.

The process arrangement unit 23 changes the execution node of the process 11 (FIG. 2) that shares data with the new process 12 (FIG. 2) that has been started in the execution node change detection unit 24, so that the execution node of the process 11 will be the same as that for the new process 12. The process arrangement unit 23 is afforded in advance with the information of the process 11 (FIG. 2) sharing data with the new process 12 (FIG. 2). Based on the information, the process arrangement unit 23 is able to identify the process 11 (FIG. 2) for which the change of the node for execution is needed.

In the process arrangement unit 23, the process of changing the execution node for the process 11 (FIG. 2) in need of the change of the execution node is carried out as an instruction for the function executing the process 11 (FIG. 2). It is presumed that the function is implemented as the general function in the information process system made up of a plurality of nodes.

The execution node change detection unit 24 receives a notification from the process start notification unit 15 (FIG. 2) of the node 1. At the same time, the execution node change detection unit 24 acquires the time of receipt of the notification from the process start notification unit 15 of the node 1 (FIG. 2). From the notification from the process start notification unit 15 (FIG. 2) of the node 1, the execution node change detection unit 24 acquires the information concerning the identifier uniquely indicating the new process 12 (FIG. 2) and the information concerning the transmission source of the notification (the node 1 which is to be the new node of execution of the new process 12). After acquiring the information, the execution node change detection unit 24 inquires the execution node recording unit 21 as to the information concerning the node 1 in which the new process 12 (FIG. 2), the execution of which has started in the new execution node, was formerly executed. The execution node change detection unit 24 compares the node where the new process 12 (FIG. 2) was formerly executed with the node 1 as the transmission source of the notification. From the result of the comparison, the execution node change detection unit 24 decides regarding the new process 12 whether the execution of the new process 12 has been re-stared in the same node, or the execution node of the new process 12 has been changed.

In the case wherein the node of execution of the new process 12 (FIG. 2) has been changed, the execution node change detection unit 24 updates, in the process migration time recording unit 22, the node execution completion time 2212 (FIG. 6) of the node execution completion time table 221 (FIG. 4) for the execution node in the past (FIG. 2) (that is, the execution node so far executing the new process 12), using the information concerning the identifier indicating the new process 12 (FIG. 2) and the information concerning the execution node obtained by inquiry to the execution node recording unit 21. As from the update time, the node execution completion time 2212 is the time the above mentioned notification was received from the process start notification unit 15 (FIG. 2).

From the process migration time recording unit 22, the execution node change detection unit 24 acquires the node execution completion time 2212 (FIG. 6) in a new execution node, using the information concerning the identifier indicating the new process 12 (FIG. 2) and the information concerning the new execution node.

Moreover, in the case wherein the node of execution of the new process 12 (FIG. 2) has been changed, the execution node change detection unit 24 instructs the process arrangement unit 23 to execute the new process 12 (FIG. 2) sharing data with the process 11 (FIG. 2) at the same time in the new execution node of the new process 12 (FIG. 2).

The execution node change detection unit 24 instructs the invalidation notification unit 25 to send out a notification to invalidate data held in the cache 13 of the node 1, using the identifier specifying the new execution node and the information of the node execution completion time 2212 acquired from the process migration time recording unit 22. When it is found that the execution node for a process that has once been changed from the node 1 to another node is again changed to the source node 1 of migration, the execution node change detection unit 24 may instruct the invalidation notification unit 25 to send a notification to invalidate data held in the cache 13 of the node 1. Such an instruction may be made on detection that the execution node of a process, which has once been changed from the node 1 to another node, has again been changed to the source node 1 of the migration first executing the process.

The data invalidation notification unit 25 sends to the cache invalidation unit 16 of the node 1 a notification to invalidate the data held in the cache 13 (FIG. 2) of the node 1 specified from the execution node change detection unit 24.

The data invalidation notification unit 25 also stores the time information specified from the execution node change detection unit 24 to transmit the so stored time information to the cache invalidation unit 16 of the node 1. The node 1 then selectively invalidates data which is retained in the cache 13 and the time of last access to which is anterior to the time stored in the notification.

Referring to FIG. 1 through FIG. 8, the operation of the exemplary embodiment will be described.

Referring now to FIG. 1, FIG. 2, FIG. 3 and FIG. 7, the sequence of operations of the node 1 detecting execution of the new process 12 (FIG. 2), sending a notification of start of execution of the process to the management node 2, then receiving a notification of cache invalidation from the management node 2 and starting execution of the new process 12 following completion of invalidation of data in the cache 13 (FIG. 2), will be described.

The process start notification unit 15 of the node 1 (for example, the node 1-1 of FIG. 16(B)), detects a start of execution of the new process 12 in the node 1 (the new process 12 corresponds to the process A returned to the node 1-1 of FIG. 16B). The new process 12 halts execution temporarily (step S11).

The process start notification unit 15 of the node 1 sends to the management node 2 (FIG. 1) a notification concerning the start of execution of a process of the new process 12 (FIG. 2). The notification includes an identifier uniquely indicating the new process 12 (step S12).

The management node 2 (FIG. 1 and FIG. 4) receives the notification from the process start notification unit 15 of step S12 (FIG. 2). The management node decides the last access time of cache data, from among cache data held in the cache 13 of the node 1 (see FIG. 2), which it is necessary to invalidate in conjunction with start of execution of the new process 12 (FIG. 2) in the node 1. It is noted that on the node 1, to which the new process 12 has migrated, the new process 12 was executed before the new process migrated from one node 1 to another node (the process A was once executed in the node 1-1 as indicated in FIG. 16A). The management node 2 (FIG. 1 and FIG. 4) sends a time of last access to cache data, which requires invalidation, as described above, to the cache invalidation unit 16 (FIG. 2) of the node 1, by way of the notification of cache invalidation (step S13).

The cache invalidation unit 16 (FIG. 2) takes out, from the notification received in a step S13 (notification of invalidation of cache data), the time of the last access to the data which requires invalidation. At the same time, the cache invalidation unit references the last access time table 141 (FIG. 2) from the access time recording unit 14 (FIG. 2) to compare it with the last access time for each data held in the cache 13 (FIG. 2).

Then, from among a plurality of items of data held in the cache 13 (FIG. 2), the cache invalidation unit 16 (FIG. 2) invalidates data with the time of last access thereto being anterior to the last access time of the data that requires invalidation (step S14).

When the process of invalidation of the step S14 has come to a close, the cache invalidation unit 16 (FIG. 2) starts execution of the new process 12 (FIG. 2) which has been temporarily halted. As the execution of the new process 12 is started, it is turned into the process 11.

As the process from the step S11 to the step S15 is carried out, the execution of the new process 12 in the node 1 is detected, and the notification of the start of execution of the process is sent from the node 1 to the management node 2. The node 1 then receives the notification of the invalidation of the cache from the management node 2. After cache invalidation 13 (FIG. 2) is completed, the operation for starting the new process 12 (FIG. 2) is completed.

Referring to FIG. 1, FIG. 4, FIG. 5, FIG. 6 and FIG. 8, the sequence of operations for the management node 2 in the step S13 of FIG. 7 will be explained in more detail.

The execution node change detection unit 24 (FIG. 4) of the management node 2 receives, in a step S201, a notification about the start of execution of the new process 12 from the process start notification unit 15 in the node 1 (FIG. 2).

The execution node change detection unit 24 (FIG. 4) of the management node 2 inquires the execution node recording unit 21 (FIG. 4) as to the information concerning an execution node of the new process 12 (FIG. 2) as the transmission source of the notification received in the step S201.

The execution node recording unit 21 of the management node 2 (FIG. 4) returns the execution node identifier 2112 (FIG. 5) for the new process 12 stored in the execution node table 211 (FIG. 4).

The execution node change detection unit 24 of the management node 2 (FIG. 4) compares, in a step S202, the node identifier that is returned from the execution node recording unit 21 (FIG. 4) with the new execution node for the new process 12 (FIG. 2) that is notified from the process start notification unit 15 of the node 1 (FIG. 2).

When the new execution node for the new process 12 notified from the process start notification unit 15 of the node 1 (FIG. 2), is the same as the last execution node (Yes in a step S203), it is unnecessary to invalidate the cache 13 (FIG. 2) of the node 1 which is the new execution node. Hence, the execution node change detection unit 24 of the management node 2 (FIG. 4) transmits to the cache invalidation unit of the new execution node (FIG. 2) a notification that it is unnecessary to invalidate the cache and terminates the process (step S204).

When the new execution node for the new process 12 differs from the last execution node (No of the step S203), the execution node change detection unit 24 of the management node 2 (FIG. 4) instructs updating of the node execution completion time table 221 (FIG. 4) stored in the process migration time recording unit 22. Specifically, the execution node change detection unit 24 of the management node 2 (FIG. 4) updates, in a step S205, the node execution completion time 2212 (FIG. 6) of the node that has served as an executing execution up to that time for the new process 12 (FIG. 2) with the time of reception of the notification of the step S201 or with the time of the current time, using the execution node identifier 2112 (FIG. 5) for the new process acquired in the step S202.

The execution node change detection unit 24 of the management node 2 (FIG. 4) instructs the execution node recording unit 21 (FIG. 4) to update the execution node for the new process 12 to a new execution node. The execution node recording unit 21 of the management node 2 updates the execution node identifier 2112 (FIG. 5), corresponding to the new process 12, in the execution node table 211 (FIG. 4), to an identifier indicating the new recording node (step S206).

The execution node change detection unit 24 of the management node 2 (FIG. 4) instructs the process arrangement unit 23 (FIG. 4) to change the execution node for the process 11 (FIG. 2), sharing data with the new process 12 (FIG. 2), to the new execution node for the new process 12 (step S207).

In the step S207, the process 11 sharing data with the new process 12 (FIG. 2) is executed. If there is no process 11 sharing data with the new process 12, the process in the step S207 is unneeded.

The execution node change detection unit 24 of the management node 2 (FIG. 4) instructs the process migration time recording unit 22 (FIG. 4) to acquire the node execution completion time 2212 (FIG. 6) for the new process 12 (FIG. 2) in the new execution node.

The process migration time recording unit 22 of the management node 2 (FIG. 4) returns the node execution completion time 2212 (FIG. 6) stored in the node execution completion time table 221 (FIG. 4) to the execution node change detection unit 24 (FIG. 4).

If, as a result of search into the node execution completion time 2212 (FIG. 6) stored in the new execution node of the new process 12, there is no execution log in the new execution node (Yes in a step S209), it is unnecessary to invalidate the cache 13 of the node 1 which is the new execution node. Hence, the execution node change detection unit 24 (FIG. 4) transmits to the cache invalidation unit 16 of the new executing node (FIG. 2) a notification stating that there is no necessity to invalidate the cache and terminates the process (step S210).

If the node execution completion time 2212 (FIG. 6) in the new execution node for the new process 12 is a time of ordinary time, and there is an execution log in the new execution node (No of the step S209), the execution node change detection unit 24 of the management node 2 (FIG. 4) notifies to the cache invalidation unit 16 (FIG. 2) of the new executing node that data with the time of the last access anterior to the node execution completion time 2212 (FIG. 6) acquired in the step S208 is invalid and then terminates the process (step S211). It is noted that, when the new process 12 is not executed for the first time in the new execution node in the step S209, that is, there is the execution log, the new execution node corresponds to the node 1-1 to which the process A has returned at T1 from the node 1-2 in FIG. 16B and in FIG. 17.

Figure 7:
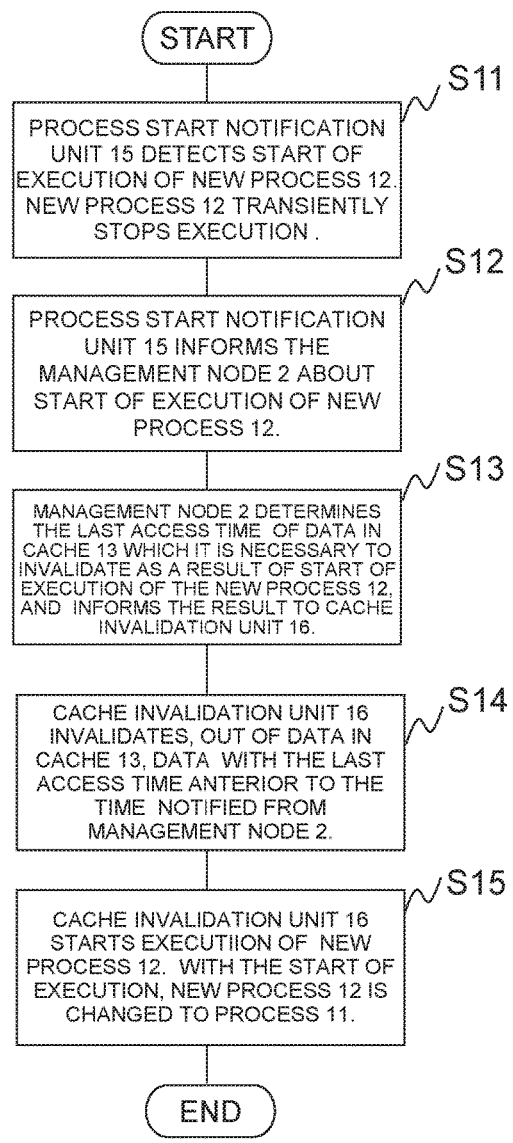
FIG. 7 is a flowchart illustrating a sequence of operations according to the exemplary embodiment of the present invention.
Figure 8:
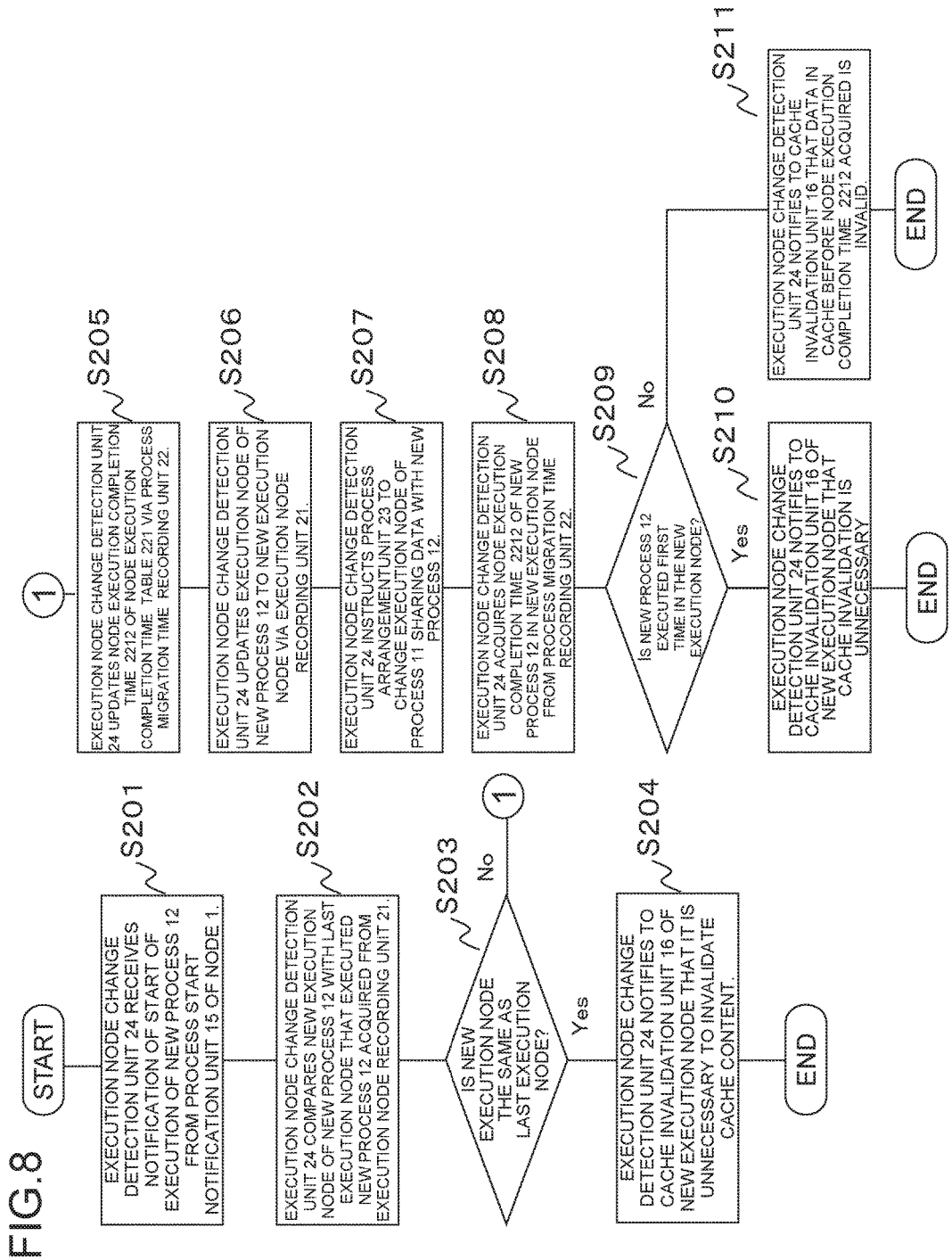
FIG. 8 is a flowchart illustrating operations of a step S13 of FIG. 7 in more detail.

With the above process from the step S201 up to the step S211, the detailed operation of the management node 2 in the step S13 of FIG. 7 is completed. The operations as from the step S205 to the step S208 may be carried out in an optional sequence. It is noted that, in the steps S204 and S210, it is notified to the new execution node that it is unnecessary to invalidate data in the cache 13 (FIG. 2). However, this notification may be dispensed with, in which case it may be notified, as in the step S211, that data with the time of the last access anterior to the specified time point is invalid. Instead, a time anterior to the time of the last access to the data held in the cache 13 (FIG. 2) may be stated as the specified time so as not to allow data to be unnecessarily invalidated.

Operation and Advantageous Effects of the Exemplary Embodiment

In the above described exemplary embodiment, the information concerning the time when the process executed in one node has migrated from the one node to another node is recorded. In the one node, as the source node of migration, among a plurality of items of data stored in a cache of the one node, the data having the time of last access in the one node (time of the last access) older than the time the process migrated from the one node to the other node is selectively invalidated. By so doing, it is possible to reduce the amount of data to be invalidated to maintain cache coherency and hence to decrease the extent of deterioration of the cache performance as well as the access performance brought about by the cache invalidation. In addition, in the above exemplary embodiment, even in the case wherein the mapping of a logical address space to a physical address space in the storage differs from node to node, there is no necessity to invalidate the entirety of the cache. It is thus possible to reduce the amount of data to be invalidated and hence to reduce deterioration of the cache performance or the access performance brought about by cache invalidation.

In the exemplary embodiment, it may be only one node, at least at one time, that accesses a shared storage. It is thus unnecessary for one node to invalidate its cache each time another node writes or updates its cache.

Moreover, in the exemplary embodiment, the timing of executing data invalidation for cache coherency in one node as the source node of migration may be retarded to the maximum extent possible. For example, the operation of data invalidation in one node as the source node of migration for maintaining cache coherency may be retarded until such time that the process migrated from one node as the source node of migration to another node returns to the one node as the source node of migration so as to be executed in the one node. In such a case, the data in the cache of the node as the source node of migration is data not accessed after the process migrated from the source node of migration to the other node, that is, data with relatively low reference frequency. By retarding the timing of invalidation for maintaining cache coherency to the maximum extent possible, it is possible to restrict the amount of data to be invalidated so as to further reduce the amount of data to be invalidated.

In the above described exemplary embodiment, process may be migrated to a single node so that a plurality of process operations sharing the data will be executed in such single node, thereby reducing the frequency of the events of data invalidation for maintaining cache coherency.

Example

As a specific example of the above described exemplary embodiment, the following describes an example of an operation of cache invalidation accompanied with a change of a node that access data with reference to FIG. 2, FIG. 4 and FIG. 7 through FIG. 14. In the present embodiment, a virtual machine (VM) is supposed to be the process 11 of FIG. 2, and migration of a virtual machine (VM) between the nodes will be described. A VM image (a disk image of a virtual environment of the virtual machine) is stored in a shared storage 33.

Figure 9:
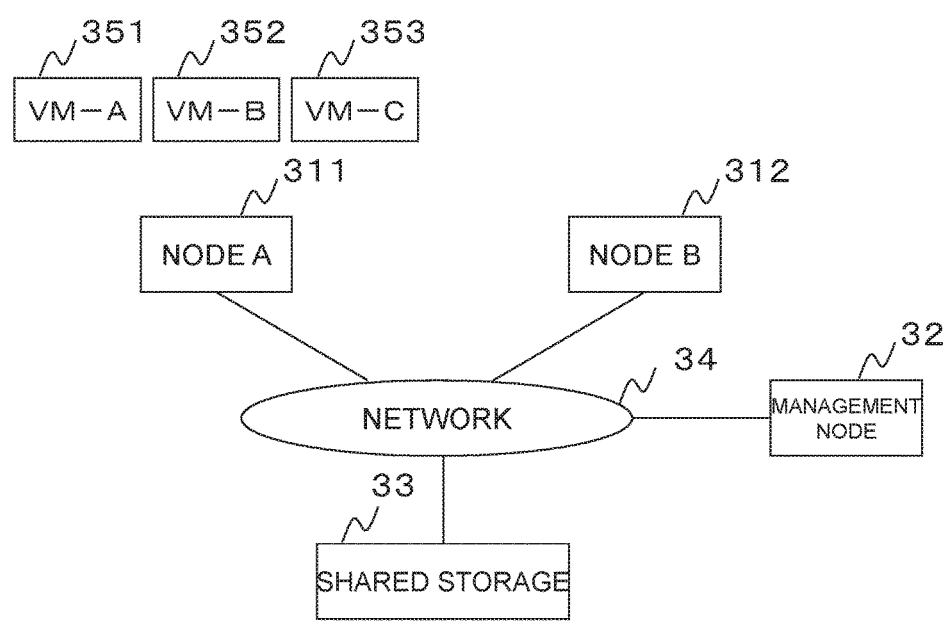
FIG. 9 is a block diagram illustrating a total system configuration according to the exemplary embodiment of the present invention.

FIG. 9 schematically illustrates a global system configuration of the present embodiment. A node A 311 and a node B 312 execute three VMs, namely a VM-A 351, a VM-B 352 and a VM-C 353. VMs are implemented on a virtualization mechanism, such as a hypervisor implemented on a computer (node) including a server or the like. In FIG. 9, VMs are disposed outside the node A or the node B for the sake of convenience in illustration.

It is assumed that, in an initial state, these three VMs (VM-A 351, VM-B 352 and VM-C 353) have not been used even only once in the node B 312. In the shared storage 33, there are stored images of these three VMs. Moreover, it is assumed that data stored in the shared storage 33 (VM images) are not shared except that part of the data is shared by the VM-A 351 and the VM-B 353. Each of the node A 311 and the node B 312 is configured as shown in FIG. 2, and includes a cache 13, an access time recording unit 14, a process start notification unit 15 and a cache invalidation unit 16. Like the configuration of the management node 2 of FIG. 4, a management node 32 includes an execution node change detection unit 24, an execution node recording unit 21, a process migration time recording unit 22, a process arrangement unit 23 and a data invalidation notification unit 25.

At a time of date change to 2013 Apr. 1 from the initial state, the execution node for the VM-A 351 is changed from the node A 311 to the node B 312 (the VM-A 351 migrates from the node A 311 to the node B 312). At this time, the newly started VM-A 351 in the node B 312 corresponds to the new process 12 of FIG. 2, and notification of start of the VM-A 351 in the node B 312 is made by the process start notification unit 15 (FIG. 2) of the node B 312 to the management node 32.

The execution node change detection unit 24 (FIG. 4) of the management node 32 receives the above notification (start of VM-A 351 in the node B 312) and decides whether or not it is necessary to invalidate data held in the cache 13 of the node B 312.

Figure 10:
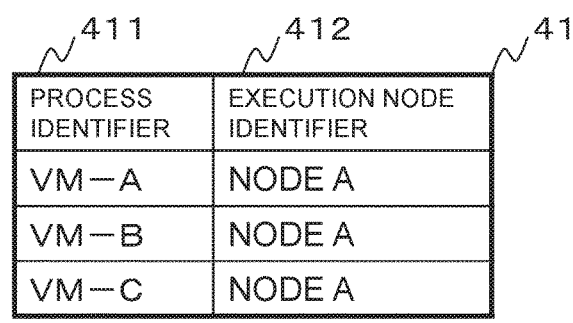
FIG. 10 is a diagram illustrating an execution node table n an initial state according to an embodiment of the present invention.

FIG. 10 illustrates an execution node table 41 in the initial state according to the present embodiment (corresponding to the execution node table 211 of FIG. 5). FIG. 11 illustrates a node execution completion time table 51 in the initial state according to the present embodiment (corresponding to the node execution completion time table 221 of FIG. 6).

In a node B execution completion time 513 in the node execution completion time table 51, the value of the node execution completion time of 1970 Jan. 1 00:00:00.000) for the three VMs of the VM-A 351, VM-B 352 and VM-C 353 indicates that these three VMs have not been executed even only once in the node B 312.

Since the VM-A 351 is started in the node B 312, its execution node differs from the execution node of the VM-A 351 stored in the execution node table 41 of FIG. 10. The execution node change detection unit 24 (FIG. 4) of the management node 32 thus updates the execution completion time in the node A 311 for the VM-A 351 in the node execution completion time table 51 of FIG. 11 in accordance with the sequence of operations shown in FIG. 8.

The execution node change detection unit 24 (FIG. 4) of the management node 32 also updates the execution node for the VM-A 351 in the execution node table 41 (FIG. 10) of the execution node recording unit 21 to the node B 312. At the same time, in the VM-C 353 that shares data with the VM-A 351, the execution node is updated to the node B 312 by the process arrangement unit 23 (FIG. 4) of the management node 32.

Regarding the VM-A 351 and the VM-C 353, with reference to the node B execution completion time 513 in the node execution completion time table 51 (FIG. 11), it is seen that none of these VMs has ever been executed in the node B 312. Hence, the management node 32 notifies to the node B 312, via the invalidation notification unit 25 (FIG. 4), that there is no necessity to invalidate cache data. The cache invalidation unit 16 (FIG. 2) of the node B 312 starts execution of the VM-A 351 and the VM-C 353 that stand in readiness for execution, as new processes, without invalidating the cache.

Moreover, in the present embodiment, the execution node for VM-A 351 is again changed to the node A 311 at the time of date change to 2013 Apr. 2.

At this time, the VM-A 351, newly started in the node A311, corresponds to the new process 12 of FIG. 2. The process start notification unit 15 of the node A 311 (FIG. 2) notifies the management node 32 about the start of the VM-A 351 in the node A 311.

The execution node change detection unit 24 of the management node 32 receives the notification from the node A 311 about the start of the new process 12 (VM-A 351) in the node A311, and decides whether or not it is necessary to make cache invalidation of data held in the cache 13 (FIG. 2) of the node A 311.

FIG. 12 illustrates the content of an execution node table 61, wherein the execution node table 61 corresponds to the execution node table 41 which is updated when the VM-A 351 is started in the node B 312, more specifically, at a time the VM-A 351 is again started in the node A 311 at the time the date is changed to 2013 Apr. 2.

FIG. 13 illustrates the content of a node execution completion time table 71, wherein the node execution completion time table 71 corresponds to the node execution completion time table 51 updated at the time of start the VM-A 351 in the node B 312.

Since the VM-A 351 is started in the node A 311, its node of execution differs from the execution node of the VM-A 351 stored in the node execution completion time table 61 (FIG. 12). The execution node change detection unit 24 of the management node 32 thus updates the execution completion time in the node execution completion time table 71 (FIG. 13) for the node B 312 for the VM-A 351 in accordance with the sequence of operations indicated in FIG. 8.

The management node 32 updates the execution node for the VM-A 351 in the execution node table 61 to the node A 311. At the same time, the execution node for the VM-C 353, sharing data with the VM-A 351, is updated to the node A 311 by the process arrangement unit 23 (FIG. 4) of the management node 32.

Regarding the VM-A 351 and the VM-C 353, with reference to a node A execution completion time 712 in the node execution completion time table 71 (FIG. 13), it is seen that both the VM-A 351 and the VM-C 353 were executed in the node A311 until the change of date to 2013 Apr. 1. It is therefore necessary to invalidate data in the cache 13 (FIG. 2) of the node A311 having the last access time anterior to the node A execution completion time (the time of date change of 2013 Apr. 1).

The execution node change detection unit 24 of the management node 32 notifies to the node A311, via the invalidation notification unit 25 (FIG. 4), that cache data with the last access times anterior to the node A execution completion time point (2013 Apr. 1 00:00:00.000 are to be invalidated.

FIG. 14 illustrates the content of a last access time table 81 stored in the access time recording unit 14 (FIG. 2) of the node A 311 (This last access time table corresponds to 141 of FIG. 3A). In the last access time table 81, there is stored time of last access to data held in the cache 13 (FIG. 2) (specified by a data identifier 811). The data identifier 811 is a page address indicating the page containing the data. It is noted that, in the data identifier (where 0x denotes that the notation is hexadecimal and each page address is composed of 8 Hex digits (32 bits)). On receipt of a notification for cache data invalidation from the invalidation notification unit 25 (FIG. 4) of the management node 32, the cache invalidation unit 16 (FIG. 2) of the node A311 compares the node A execution completion time (2013 Apr. 1 00:00: 00.000) stored in the notification to the times of last access to each data held in the cache 13 (FIG. 2).

The time of the completion of the node A execution, stored in the notification, is a time when the execution node of the VM-A 351 is first changed from the node A 311 to the node B 312, that is, 2013 Apr. 1 0.00:00.000. The time of last access to data in the cache 13 of the node A311 is stored in the last access time table 81 (FIG. 14). It is solely the data identifier 811 0x10000000 with the time of last access of 2013 May 31 23.45:12.876 that has the time of last access 812 anterior to the time 2013 Apr. 1 0.00:00.000 stored in the notification.

In short, the data with the data identifier 811 of 0x10000000 is the data accessed when the VM-A 351 and VM-C 353 were executed in the past in the node A 311 and may have been updated, when the VM-A 351 and VM-C 353 were subsequently executed in other than the node A 311.

The cache invalidation unit 16 (FIG. 2) of the node A 311 instructs the cache 13 (FIG. 2) of the node A 311 to invalidate only the data with the data identifier 811 of 0x10000000. It is thus possible to reduce the amount of data to be invalidated in the cache 13 (FIG. 2) accompanied with inter-VM migration of VMs.

Finally, the cache invalidation unit 16 (FIG. 2) of the node A 311 starts execution of the VM-A 351 and VM-C 353 as new process.

In the above embodiment, invalidation of cache in the node in the inter-node migration of the virtual machine (VM) is described. There may be provided another embodiment in which the data access process (process 11 of FIG. 2) is migrated from a first VM to a second VM on a virtualization system exemplified by a hypervisor implemented on a computer, such as a server or the like, the same node. In this case, a shared storage, a cache, a CPU, a memory, a network or the like resources are virtualized with respect to each VM (node) via the hypervisor. When the VM executing the access process to data is changed from the first VM to the second VM, the second VM, now taking over the access process, invalidates such data that is stored in the virtualized cache of the second VM and the time of the last access to which in the second VM is older than the time the access process has been taken over from the first VM to the second VM (invalidation reference time). That is, the exemplary embodiment described above may directly be applied provided that the virtual machine (VM) is deemed to be a node and that the virtualized cache on the VM is deemed to be a cache (13 of FIG. 2) of the node. The management node 2 of FIG. 2 may, of course, be implemented as a VM.

In the above described embodiments, time information when a virtual machine (VM) executing data access process has migrated from one of a plurality of nodes, each including a cache temporarily holding data of a shared storage, to another node, is recorded. Among a plurality of items of data held in the cache of one node as a source node of migration, such data that is accessed last time in the one node by the process before migration to the other node and that is older than a time of migration of the process from the one node to the other node is selectively invalidated. By doing so, it is possible to reduce the frequency of invalidation of the cache and the amount of data to be invalidated to maintain cache coherency, thereby mitigating the adverse effect of deterioration of the access performance otherwise brought about by the cache invalidation.

The disclosures of the above mentioned Non-Patent Literature are to be incorporated herein by reference. The exemplary embodiments or Examples may be modified or adjusted within the concept of the total disclosures of the present invention, inclusive of claims, based on the fundamental technical concept of the invention. A series of combinations or selections of elements herein disclosed may be made within the context of the claims of the present invention. That is, the present invention may include a wide variety of changes or corrections that may occur to those skilled in the art in accordance with the total disclosures inclusive of the claims and the drawings as well as the technical concept of the invention.

The invention claimed is:

1. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein the one node is configured to execute the selective invalidation at a preset timing following a time when the process returns again to the one node after migrating from the one node to the other node.

2. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein the one node is configured to execute the selective invalidation of data, with an access request to the data held in the cache of the one node with the time of last access thereto by the process on the one node being older than the time of the migration of the process from the one node to the other node, as a trigger, the access request to the data being made by the process that returns to the one node after migrating to the other node.

3. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein the one node is configured to exclude data held in the cache of the one node and accessed, after the migration of the process from the one node to the other node, by a process other than the process migrating to the other node, from a subject of invalidation in the cache of the one node.

4. A storage system, comprising:
a plurality of nodes; and
a storage shared by the plurality of nodes,
wherein each of the nodes includes
a cache that holds temporarily data stored in the storage, wherein time information when a process accessing data migrates from one node to other node is recorded, and the one node, after migration of the process from the one node to the other node, selectively invalidates, out of data held in the cache of the one node, data accessed at least by the process on the one node with a time of last access thereto by the process being older than a time of the migration of the process from the one node to the other node, wherein the one node is configured to invalidate as well, data held in the cache of the one node with a time of last access thereto by a process other than the process migrating to the other node being older than the time of the migration of the process migrating to the other node.

5. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein access to data in the storage is executed from a single node at one time, for a write in a cache in the single node, cache invalidation in another node being necessitated.

6. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein when a node executing a first process differs from a node executing a second process sharing data with the first process, the first process or the second process is migrated between the nodes so that the first process and the second process is executed in an identical node.

7. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node, and a notification unit that informs a management unit about a start of execution of a process accessing data, wherein the management unit includes:
an execution node change detection unit that detects a change of a node executing a process accessing data;
an execution node recording unit that records information concerning the node that executes the process;
a time recording unit that records a time when the process accessing the data on the node that executes the process is executed last time;
a process arrangement unit that locates a process so that a plurality of processes accessing data shared by the processes are sequentially executed in an identical node; and
an invalidation notification unit that notifies the one node to invalidate, out of data held in the cache of the one node, data accessed at least by the process on the one node with the time of last access thereto by the process being older than the time of the migration of the process from the one node to the other node,
the invalidation notification unit informing the one node about the time when the process accessing the data on the one node that executes the process was last executed.

8. A storage system, comprising:
a plurality of nodes; and
a storage shared by the plurality of nodes,
wherein each of the nodes includes
a cache that holds temporarily data stored in the storage,
wherein time information when a process accessing data migrates from one node to other node is recorded, and
the one node, after migration of the process from the one node to the other node, selectively invalidates, out of data held in the cache of the one node, data accessed at least by the process on the one node with a time of last access thereto by the process being older than a time of the migration of the process from the one node to the other node,
wherein the one node includes a virtualization mechanism, the process being executed on a virtual machine on the virtualization mechanism, and wherein
a change of the one node that executes the process is implemented by inter-node migration of the virtual machine.

9. A management apparatus connected to a plurality of nodes, each of which includes a cache that temporarily holds data of a storage shared by the nodes; the management apparatus receiving from a node a notification about a start of execution of a process of data accessing; the management apparatus comprising:
an execution node change detection unit that detects a change of the node executing the process of data accessing;
an execution node recording unit that records information concerning the node that executes the process;
a time recording unit that records a time when the process accessing the data is executed last time in the node that executes the process;
a process arrangement unit that sets a location of the process so that a plurality of access processes sharing the data are sequentially executed in an identical node; and
an invalidation notification unit that informs the node about invalidation of data held in the cache of the node,
the invalidation notification unit informing the node about the time of the change of the node that executes the access process.

10. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
the one node executing the invalidation at a timing following a time when the process returns again to the one node after migrating from the one node to the other node.

11. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
the one node executing the selective invalidation of data, with an access request to the data held in the cache with a time of last access thereto by the process on the one node being older than the time of migration of the process from the one node to the other node, as a trigger, the access request to the data being made by the process that returns again to the one node after migrating to the other node.

12. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
the one node excluding data held in the cache of the one node and accessed, after the migration of the process from the one node to the other node, by a process other than the process migrating from the one node to the other node from a subject of the invalidation in the cache of the one node.

13. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
the one node invalidating as well, data held in the cache of the one node with a time of last access thereto by a process other than the process that migrates to the other node being older than the time of the migration of the process to the other node.

14. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
executing access to data held in the storage by a single node at least at one time, for a write in a cache in the single node, cache invalidation being necessitated in another node.

15. A cache controlling method, comprising
recording time information when a process accessing data migrates from one node of a plurality of nodes to other node, each of the plurality of nodes including a cache in which data stored in a storage shared by the plurality of nodes is held temporarily;
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger; and
when a node executing a first process differs from a node executing a second process sharing data with the first process,
migrating the first process or the second process between the nodes so that the first process and the second process are executed in an identical node.

16. A cache controlling method, comprising
recording time information when a process accessing data migrates from one node of a plurality of nodes to other node, each of the plurality of nodes including a cache in which data stored in a storage shared by the plurality of nodes is held temporarily; and
after migration of the process from the one node to the other node, the one node selectively invalidating, out of data held in the cache of the one node, data accessed at least by the process on the one node with a time of last access thereto by the process being older than a time of the migration of the process from the one node to the other node, at a preset timing or with a preset trigger, wherein the one node includes a virtualization mechanism, the method comprising:

executing the access process on a virtual machine on the virtualization mechanism; and implementing migration of the process by inter-node migration of the virtual machine.

17. A node apparatus, including a cache that temporarily stores data of a storage shared by a plurality of node apparatuses, the node apparatus comprising:

an access time recording unit that records a time of an access each time the access is made to data held in the cache; and a cache invalidation unit that compares a time of last access to the data held in the cache, recorded in the access time recording unit with an invalidation reference time received and that selectively invalidates data with a time of last access anterior to the invalidation reference time, wherein the invalidation reference time is a time when a process accessing data migrates from the node apparatus as a source of migration to another node apparatus.

18. The node apparatus according to claim 17, wherein the cache invalidation unit selectively invalidates data held in the cache with a time of last access thereto being anterior to the invalidation reference time, at a timing subsequent to a time when the process returns again to the node apparatus after migrating from the node apparatus to the other node apparatus.

19. The node apparatus according to claim 18, wherein the cache invalidation unit selectively invalidates the data, with an access request made by the process that returns again to the node apparatus after migrating to the other node, to data held in the cache thereof with a time of last access thereto by the process on the node apparatus being older than a time of the migration of the process from the node apparatus to the other node apparatus, as a trigger.

20. A non-transitory computer-readable medium, storing therein a program that causes a computer constituting a node apparatus including a cache that temporarily holds data stored in a storage shared by a plurality of node apparatuses to execute a processing comprising:

an access time recording processing that records an access time each time an access is made to data held in the cache; and a cache invalidation processing that compares a last access time to data held in the cache, recorded by the access time recording processing with an invalidation reference time received and that selectively invalidates data held in the cache with the last access time being anterior to the invalidation reference time, at a preset timing or by a trigger before the data held in the cache is accessed, wherein the invalidation reference time is a time when a process accessing data migrates from the node apparatus as a source node of migration to other node apparatus.

21. The non-transitory computer-readable medium according to claim 20, wherein the node apparatus is configured to execute the selective invalidation at a preset timing following a time when the process returns again to the node apparatus after migrating from the node apparatus to the other node apparatus.

22. The non-transitory computer-readable medium according to claim 20, wherein the cache invalidation processing executes the selective invalidation of data, with an access request to the data held in the cache with a time of last access thereto by the process on the node apparatus being older than a time of the migration of the process from the node apparatus to the other node apparatus, as a trigger, the access request to the data being made by the process that returns again to the node apparatus after migrating to the other node apparatus.

* * * * *